(12) United States Patent
Oba

(10) Patent No.: US 8,582,069 B2
(45) Date of Patent: Nov. 12, 2013

(54) LIQUID CRYSTAL DEVICE AND PROJECTION-TYPE DISPLAY APPARATUS

(75) Inventor: Kazuyuki Oba, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 58 days.

(21) Appl. No.: 13/252,336

(22) Filed: Oct. 4, 2011

(65) Prior Publication Data

US 2012/0113333 A1 May 10, 2012

(30) Foreign Application Priority Data

Nov. 4, 2010 (JP) ................................. 2010-247144

(51) Int. Cl.
 *G02F 1/1345* (2006.01)
 *G02F 1/1339* (2006.01)
 *G02F 1/1368* (2006.01)

(52) U.S. Cl.
 USPC .............. 349/149; 349/139; 349/153; 349/39

(58) Field of Classification Search
 USPC ................... 349/5, 38, 39, 139, 190, 149–153
 See application file for complete search history.

(56) References Cited

U.S. PATENT DOCUMENTS

| | | | | |
|---|---|---|---|---|
| 5,619,358 A | * | 4/1997 | Tanaka et al. | 349/143 |
| 5,953,094 A | * | 9/1999 | Matsuoka et al. | 349/153 |
| 6,124,916 A | | 9/2000 | Kaneko et al. | |
| 6,219,124 B1 | * | 4/2001 | Lee et al. | 349/147 |
| 6,268,898 B1 | * | 7/2001 | Ihara | 349/155 |
| 6,335,779 B1 | * | 1/2002 | Morii et al. | 349/155 |
| 6,888,606 B2 | * | 5/2005 | Hinata et al. | 349/149 |
| 7,092,050 B2 | * | 8/2006 | Hanakawa et al. | 349/111 |
| 8,030,103 B2 | * | 10/2011 | Park et al. | 438/27 |
| 2004/0245533 A1 | * | 12/2004 | Imazeki et al. | 257/93 |
| 2007/0146598 A1 | * | 6/2007 | Yokokawa et al. | 349/123 |
| 2009/0066870 A1 | * | 3/2009 | Yagi et al. | 349/40 |
| 2010/0173433 A1 | * | 7/2010 | Park et al. | 438/27 |

FOREIGN PATENT DOCUMENTS

| | | |
|---|---|---|
| JP | 02-280374 A | 11/1990 |
| JP | 10-241861 A | 9/1998 |
| JP | 2007-304384 A | 11/2007 |
| WO | WO-97-034191 A | 9/1997 |

* cited by examiner

*Primary Examiner* — Bumsuk Won
*Assistant Examiner* — Jia Pan
(74) *Attorney, Agent, or Firm* — ALG Intellectual Property, LLC

(57) ABSTRACT

A liquid crystal device and a projection-type display apparatus provided with the liquid crystal device are provided in which it is possible to prevent an electrochemical corrosion reaction from occurring in the course of a process. An aluminum film constituting a first terminal and a first electrode for inter-substrate connection formed to be electrically separated (insulated) from each other on one face side of a first substrate of the liquid crystal device, an ITO film constituting a dummy pixel electrode and a second electrode of inter-substrate connection, a common electrode (second substrate side electrode) formed on a second substrate are electrically connected by an inter-substrate connection member provided between the first substrate and the second substrate.

12 Claims, 12 Drawing Sheets

LIQUID CRYSTAL DEVICE AND PROJECTION-TYPE DISPLAY APPARATUS

BACKGROUND

1. Technical Field

The invention relates to a liquid crystal device in which liquid crystals are retained between a pair of substrates, and a projection-type display apparatus using the liquid crystal device as a light valve.

2. Related Art

In a liquid crystal device, a first substrate provided with a pixel area in which pixel electrodes are arranged on one side thereof, and a second substrate provided with a common electrode to which common potential is applied are bound and joined by a seal member, and a liquid crystal layer is retained in an area surrounded with the seal member between the first substrate and the second substrate. The liquid crystal device is used as a light valve of a direct view type display apparatus or a projection-type display apparatus.

Power supply or signal input to such a liquid crystal device is performed through a terminal formed on the first substrate. For this reason, a structure is employed, in which the first substrate is provided with a terminal and an inter-substrate connection electrode electrically connected to the terminal, and the inter-substrate connection electrode and the common electrode of the second substrate are electrically connected to each other by the inter-substrate connection member interposed between the first substrate and the second substrate (see International Publication No. WO97/34191).

The first substrate may be provided with a dummy pixel electrode to which common potential is applied, in addition to the pixel electrode (JP-A-2007-304384).

Also in this case, the terminal and the dummy pixel electrode are electrically connected, and the common potential applied to the terminal of the first substrate is supplied to the dummy pixel electrode.

In the liquid crystal device with such a configuration, to form the terminal, the inter-substrate connection electrode, and the dummy pixel electrode, etching is performed in a state where a resist mask is formed on the surface of a conductive film formed on the first substrate, to pattern the conductive film.

However, in the technique described in International Publication No. WO97/34191 and JPA-2007-304384, when the terminal and the inter-substrate connection electrode are formed by conductive films with different standard electrode potentials, there is a problem in which an electrode formed of a conductive film with low standard electrode potential of the terminal and the inter-substrate connection electrode is not formed with high precision. That is, although the terminal and the inter-substrate connection electrode are electrically connected to each other, when the terminal and the inter-substrate connection electrode are formed by conductive films with different standards of electrode potential, and when the terminal and the inter-substrate connection electrode come in contact with a stripper for striping the resist mask (electrolysis solution), an electrochemical corrosion reaction (local battery corrosion reaction) proceeds between the terminal and the inter-substrate connection electrode in the stripper, and the conductive film with low standard electrode potential is eluted into the stripper. Further, not limited to the stripping of the resist mask, the electrochemical corrosion reaction proceeds even when the terminal and the inter-substrate connection electrode come in contact with the etching liquid at the time of wet etching, and the conductive film with low standard electrode potential is eluted into the etching liquid (electrolysis solution). The problem occurs also when the terminal and the dummy pixel electrode are formed by conductive films with different standard electrode potential.

Such a problem may be avoided by employing a configuration of forming the terminal and the inter-substrate connection electrode by the same conductive film or a configuration of forming the terminal and the dummy pixel electrode by the same conductive film. However, there are many cases where it is difficult to form the terminal, the inter-substrate connection electrode, and the dummy pixel electrode by the same conductive film when they are formed together with other electrodes.

SUMMARY

An advantage of some aspects of the invention is to provide a liquid crystal device capable of preventing an electrochemical corrosion reaction from occurring in the course of a wet process even when electrodes which have to be electrically connected to each other on the same substrate are formed by conductive materials with different standard electrode potential, and a projection-type display device including the liquid crystal device.

According to an aspect of the invention, there is provided a liquid crystal device including: a first substrate that is provided with pixel electrodes on one face side; a second substrate that is provided with a second substrate side electrode on a face side opposed to the one face side of the first substrate; a liquid crystal layer that is retained between the first substrate and the second substrate; a terminal that is provided on the one face side of the first substrate; a first electrode for inter-substrate connection that that is electrically connected to the terminal and is formed of a conductive film formed of the same material as that of the terminal on the one face side of the first substrate; a first substrate side electrode that separates the terminal and the first electrode for inter-substrate connection by a conductive film formed of a material different from that of the terminal, and is formed on the one face side of the first substrate; a second electrode for inter-substrate connection that is electrically connected to the first substrate side electrode by a conductive film formed of the same material as that of the first substrate side electrode, separates the terminal and the first electrode for inter-substrate connection, and is formed on the one face side of the first substrate; and an inter-substrate connection member that is interposed between the first substrate and the second substrate to electrically connect the first electrode for inter-substrate connection and the second electrode for inter-substrate connection separately formed on the one face side of the first substrate to the second substrate side electrode.

In the aspect of the invention, the terminal, and the first electrode for inter-substrate connection electrically connected to the terminal are formed on one face side of the first substrate, and the terminal and the first electrode for inter-substrate connection are configured by the same conductive film. In addition, the first substrate side electrode, and the second electrode for inter-substrate connection electrically connected to the first substrate side electrode terminal are formed on one face side of the first substrate, and the first substrate side electrode and the second electrode for inter-substrate connection are configured by the same conductive film. Even when the conductive film constituting the terminal and the first electrode for inter-substrate connection, and the conductive film constituting the first substrate side electrode and the second electrode for inter-substrate connection are different in kind, they are insulated in an independent state of the first substrate. For this reason, in the process of producing the first substrate, when stripping of a resist mask by a stripper, or a wet process using electrolysis solution such as wet etching is performed, and even when the terminal, the first electrode for inter-substrate connection, the first substrate side electrode terminal, and the second electrode for inter-substrate connection come in contact with the same electrolysis solution, the electrochemical corrosion reaction (local battery corrosion reaction) does not occur. Accordingly, a problem in which the conductive film with low standard electrode potential is eluted into the electrolysis solution does not occur. Therefore, it is possible to form the terminal, the first electrode for inter-substrate connection, the first substrate side electrode, and the second electrode for inter-substrate connection, with high precision in size and high precision in shape. In the independent state of the first substrate, the conductive film constituting the terminal and the first electrode for inter-substrate connection, and the conductive film constituting the first substrate side electrode and the second electrode for inter-substrate connection are insulated. However, when the first substrate and the second substrate are joined through the inter-substrate connection member, the first electrode for inter-substrate connection, the second electrode for inter-substrate connection, and the second substrate side electrode are electrically connected by the inter-substrate connection member. Accordingly, it is possible to supply the potential applied to the terminal, to the first substrate side electrode and the second substrate side electrode.

In the aspect of the invention, it is preferable that the first electrode for inter-substrate connection and the second electrode for inter-substrate connection are provided at positions adjacent to each other with a gap interposed therebetween, and that the first electrode for inter-substrate connection, the second electrode for inter-substrate connection, and the second substrate side electrode are electrically connected to each other through the same inter-substrate connection member provided at least at the gap. With such a configuration, it is possible to achieve inter-substrate connection using the inter-substrate connection member in the narrow area.

Herein, the inter-substrate connection member is in a state where conductive particles are dispersed in a resin component. Accordingly, "the same inter-substrate connection member" in this specification includes a configuration in which the electrodes are electrically connected to each other by the inter-substrate connection member provided at the same portion although the electrodes are electrically connected to each other by other conductive particles, in addition to a configuration in which the electrodes are electrically connected by the same conductive particles.

In the aspect of the invention, it is preferable that the first electrode for inter-substrate connection and the second electrode for inter-substrate connection are provided in a shape with a concave portion in which a convex portion is wedged from one side electrode toward the other side electrode in the face of the first substrate. With such a configuration, even when the position of the inter-substrate connection member slightly deviates, it is possible to reliably and electrically connect the first electrode for inter-substrate connection to the second electrode for inter-substrate connection by the inter-substrate connection member.

In the aspect of the invention, it is preferable that the second substrate side electrode is a common electrode opposed to the plurality of pixel electrodes.

In the aspect of the invention, it is preferable that the first substrate side electrode is a dummy pixel electrode provided in a neighboring area outside the pixel area in which the pixel electrodes are provided.

In the aspect of the invention, it is preferable that the first substrate side electrode and the second electrode for inter-substrate connection are conductive metal oxide layers, and that the terminal and the first electrode for inter-substrate connection are metal layers with standard electrode potential lower than that of the metal oxide layer.

In the aspect of the invention, it is preferable that a plurality of sets of the terminal, the first electrode for inter-substrate connection, the second electrode for inter-substrate connection, the first substrate side electrode, the second substrate side electrode, and the inter-substrate connection member are provided, to which different potentials are applied.

The liquid crystal device according to the aspect of the invention is used, for example, as a light valve of a projection-type display apparatus, or a direct view type display apparatus. When the liquid crystal device according to the aspect of the invention is used in the projection-type display apparatus, the projection-type display apparatus is provided with a light source unit that outputs light supplied to the liquid crystal device, and a projection optical system that projects light modulated by the liquid crystal device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
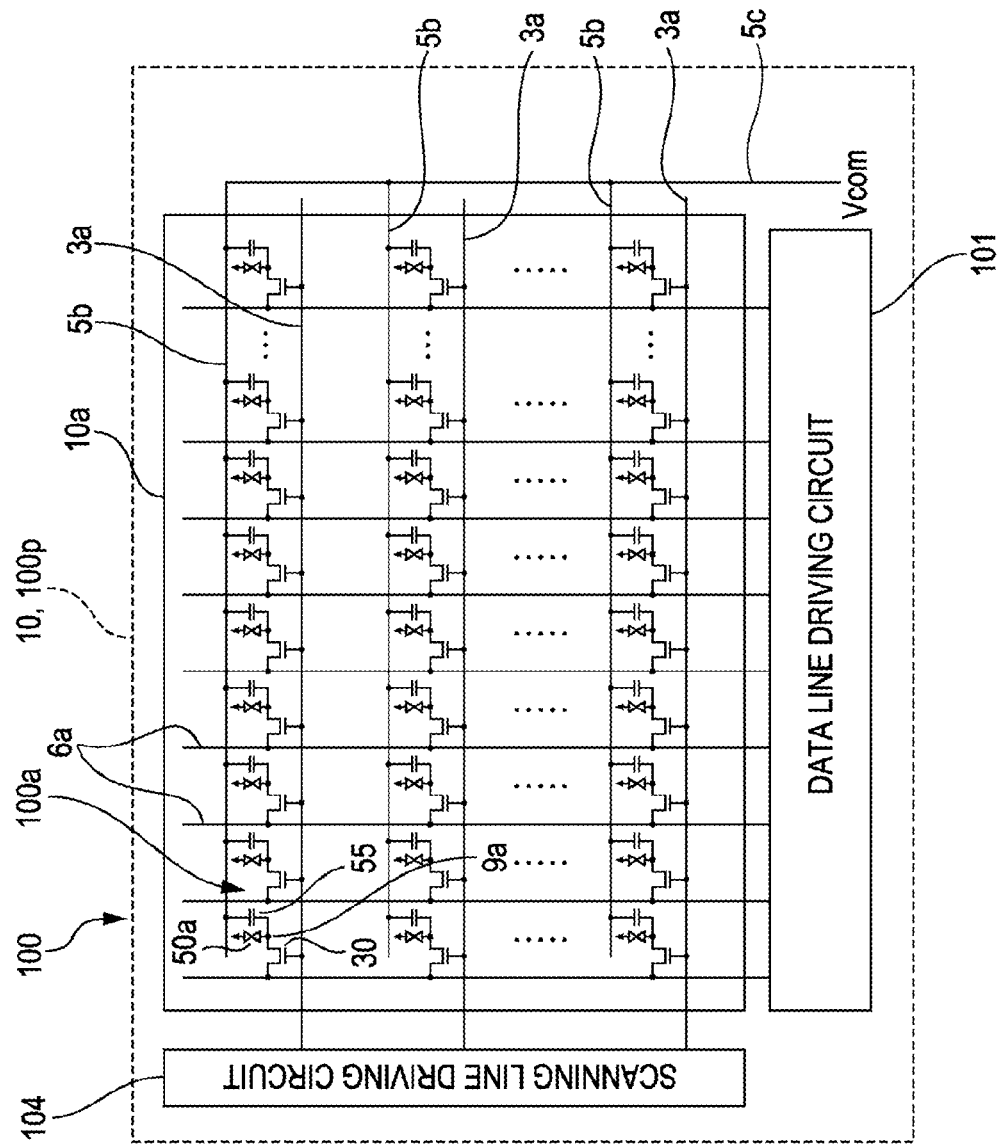
FIG. 1 is a block diagram illustrating an electrical configuration of a liquid crystal device according to the invention.

Embodiments of the invention will be described with reference to the drawings. In the drawings referred to in the following description, layers and members are reduced in scale to make them recognizable on the drawings. When the direction of current flowing in an electric field effect transistor is reversed, the source and drain are switched, but in the following description, for convenience, the side coming into contact with a pixel electrode is the drain, and the side coming into contact with a data line is the source.

Embodiment 1

Overall Configuration

FIG. 1 is a block diagram illustrating an electrical configuration of a liquid crystal device according to the invention. In FIG. 1, a liquid crystal device 100 of the embodiment is a liquid crystal panel 100p of a TN (Twisted Nematic) mode or a VA (Vertical Alignment) mode, and the liquid crystal panel 100p is provided with a pixel area 10a (image display area) in which a plurality of pixels 100a is arranged in matrix at the center area thereof. In the liquid crystal panel 100p, in a first substrate 10 (see FIG. 2A and FIG. 2B) to be described later, a plurality of data lines 6a and a plurality of scanning lines 3a are longitudinally and transversely arranged in the pixel area 10a, and the pixels 100a are provided at positions corresponding to the intersections thereof. Each of the pixels 100a is provided with a pixel transistor 30 formed of an electric field effect transistor, and a pixel electrode 9a to be described later. A source of the pixel transistor 30 is electrically connected to the data line 6a, the gate of the pixel transistor 30 is electrically connected to the scanning line 3a, and the drain of the pixel transistor 30 is electrically connected to the pixel electrode 9a.

A scanning line driving circuit 104 and a data line driving circuit 101 are provided on the outer peripheral side out of the pixel area 10a of the first substrate 10. The data line driving circuit 101 is electrically connected to the data lines 6a, and sequentially supplies image signals supplied from an image processing circuit, to the data lines 6a. The scanning line driving circuit 104 is electrically connected to the scanning lines 3a, and sequentially supplies scanning signals to the scanning lines 3a.

For each pixel 100a, the pixel electrode 9a is opposed to a common electrode formed on a second substrate 20 (see FIG. 2A and FIG. 2B) to be described later with a liquid crystal layer interposed therebetween, to constitute a liquid crystal capacity 50a. A retention capacity 55 is added to each pixel 100a parallel to the liquid crystal capacity 50a to prevent an image signal retained in the liquid crystal capacity 50a from fluctuating. In the embodiment, to constitute the retention capacity 55, capacity lines 5b are formed parallel to the scanning lines 3a throughout the plurality of pixels 100a. In the embodiment, the capacity lines 5b are electrically connected to a common potential line 5c to which a common potential Vcom is applied.

Configuration of Liquid Crystal Panel 100p and First Substrate 10

Figure 2A:
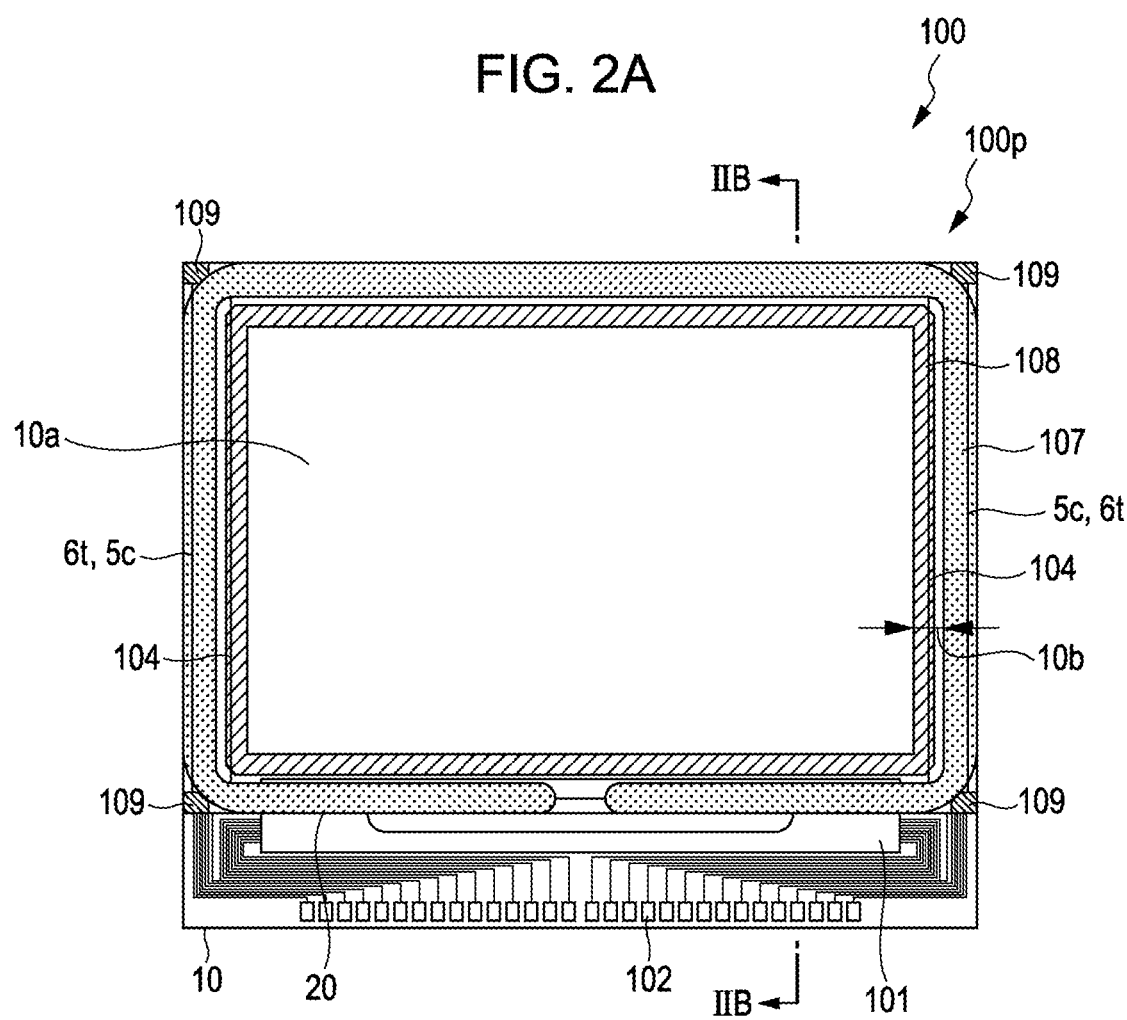
FIG. 2A and FIG. 2B are diagrams illustrating a liquid crystal panel of the liquid crystal device according to the invention.
Figure 2B:
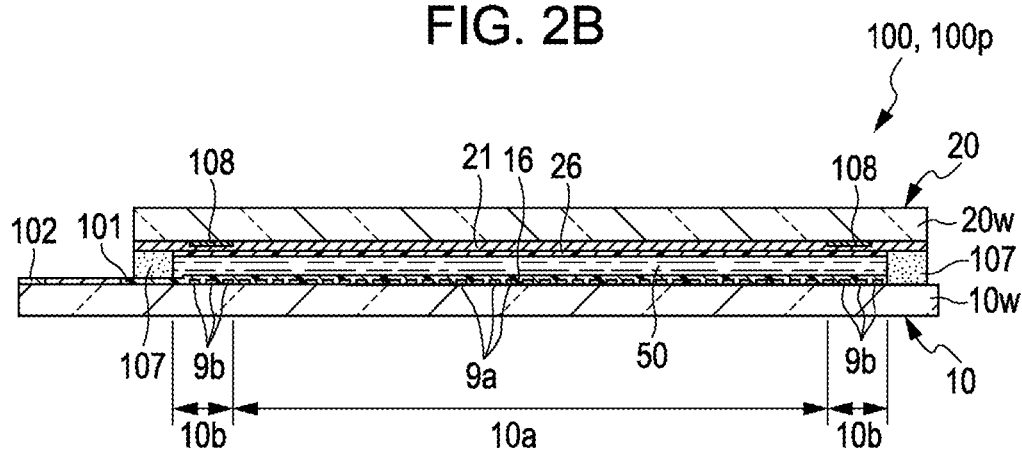

FIG. 2A and FIG. 2B are diagrams illustrating a liquid crystal panel 100p used in the liquid crystal device 100 according to the invention, FIG. 2A is a plan view of the liquid crystal panel 100p of the liquid device 100 according to the invention as viewed from the side of the opposed substrate with constituent elements, and FIG. 2B is a cross-sectional view thereof taken along the line IIB-IIB. As shown in FIG. 2A and FIG. 2B, in the liquid crystal panel 100p, the first substrate 10 and the second substrate 20 are joined by a seal member 107 with a predetermined gap, and the seal member 107 is provided in a frame shape along an outer frame of the second substrate 20. The seal member 107 is an adhesive agent formed of light-curing resin or thermosetting resin, in which a gap member, such as glass fibers and glass beads, is mixed such that the distance between both substrates becomes a predetermined value.

In the liquid crystal panel 100p with such a configuration, both of the first substrate 10 and the second substrate 20 are square, and the pixel area 10a described with reference to FIG. 1 is provided as a square area substantially at the center of the liquid crystal panel 100p. The seal member 107 is also substantially square corresponding to the shape, and a substantially square peripheral area 10b is provided in a frame shape between the inner periphery of the seal member 107 and the outer periphery of the pixel area 10a. In the first substrate 10, the data line driving circuit 101 and a plurality of terminals 102 are formed along one side of the first substrate 10 on the outside of the pixel area 10a, and the scanning line driving circuit 104 is formed along the other side adjacent to the one side. The terminals 102 are connected to a flexible wiring board (not shown), and various potentials or various signals are input to the first substrate 10 through the flexible wiring board.

Although the details will be described later, in the pixel area 10a on one side of the first substrate 10, the pixel transistors 30 described with reference to FIG. 1 and the pixel electrodes 9a electrically connected to the pixel transistors 30 are formed in matrix, and the alignment film 16 is formed on the upper layer side of the pixel electrodes 9a.

In the peripheral area 10b on the one side of the first substrate 10, dummy pixel electrodes 9b (see FIG. 2B) are formed together with the pixel electrodes 9a. In the embodiment, the dummy pixel electrodes 9b, to which the common potential Vcom is applied, prevents alignment of liquid crystal molecules from being confused at the outer peripheral side end of the pixel area 10a. When planarizing the face on which the alignment film 16 is formed on the first substrate 10 by polishing, the dummy pixel electrodes 9b contribute to reducing the difference in height positions between the pixel area 10a and the peripheral area 10b and making the face on which the alignment film 16 is formed flat.

A common electrode 21 is formed on one side of the second substrate 20 opposed to the first substrate 10, and an alignment film 26 is formed on the upper layer of the common electrode 21. The common electrode 21 is formed substantially on the whole face of the second substrate 20 or throughout the plurality of pixels 100a as a plurality of stripe-shaped electrodes. On one side of the second substrate 20 opposed to the first substrate 10, a light shield layer 108 is formed on the lower layer side of the common electrode 21. In the embodiment, the light shield layer 108 is formed in a frame shape extending along the outer periphery of the pixel area 10a. The outer periphery of the light shield layer 108 is at a position separating the gap from the inner periphery of the seal member 107, and the light shield layer 108 does not overlap with the seal member 107. In the second substrate 20, the light shield layer 108 may be formed in an area overlapping with an area pinched between pixel electrodes 9a adjacent to each other.

In the liquid crystal panel 100p with such a configuration, the first substrate 10 is an inter-substrate connecting unit 109 for electrical connection between the first substrate 10 and the second substrate 20 in an area overlapping angled parts of the second substrate 20 on the side outer than the seal member 107. The inter-substrate connection unit 109 is provided with an inter-substrate connection member 109a including conductive particles, and the common electrode 21 of the second substrate 20 is electrically connected to the first substrate 10 through the inter-substrate connection member 109a and an inter-substrate connection electrode to be described later. For this reason, the common potential Vcom is applied from the side of the first substrate 10 to the common electrode 21. The seal member 107 has substantially the same width size, and is provided along the outer periphery of the second substrate 20. For this reason, the seal member 107 is substantially square. However, the seal member 107 is provided to pass through the inside by avoiding the inter-substrate connection unit 109 in the area overlapping with the angled parts of the second substrate 20, and the angled parts of the seal member 107 have a substantially circular arc shape.

In the liquid crystal device 100 with such a configuration, when the pixel electrode 9a and the common electrode 21 are formed of a transparent conductive film, it is possible to configure a transparent-type liquid crystal device. Conversely, when one side of the pixel electrode 9a and the common electrode 21 is formed of a transparent conductive film and the other side is formed of a reflective conductive film, it is possible to configure a reflection-type liquid crystal device. When the liquid crystal device 100 is the reflection type, light input from one side of the first substrate 10 side and the second substrate 20 side is modulated while it is reflected and is output from the other side substrate, thereby displaying an image. When the liquid crystal device 100 is the transparent type, light input from one side of the first substrate 10 side and the second substrate 20 side is modulated while it passes through and is output from the other side substrate, thereby displaying an image.

The liquid crystal device 100 may be used as a color display device of an electronic apparatus such as a mobile computer and a mobile phone. In this case, the second substrate 20 is provided with a color filter (not shown) or a protective film. In the liquid crystal device 100, a polarization film, a phase differential film, a polarization plate, and the like are provided in a predetermined direction with respect to the liquid crystal panel 100p, according to the kinds of liquid crystal layer 50 used, or each of a normally white mode and a normally black mode. The liquid crystal device 100 may be used as a light valve for RGB in a projection-type display apparatus (liquid crystal projector) to be described later. In this case, each color of light resolved through a dichroic mirror for resolving RGB is input as transmission light to each of the liquid crystal devices 100 for RGB, and a color filter is not formed.

In the embodiment, a case where the liquid crystal device 100 is the transparent-type liquid crystal device used as a light valve for RGB in a projection-type display apparatus to be described later and the light input from the second substrate 20 passes through the first substrate 10 and is output is mainly described. In the embodiment, in the liquid crystal device 100 of the embodiment, as the liquid crystal layer 50, a nematic liquid crystal compound with negative dielectric anisotropy may be employed, and a case where the liquid crystal panel 100p is configured for a VA mode will be mainly described.

Specific Configuration of Pixel

Figure 3A:
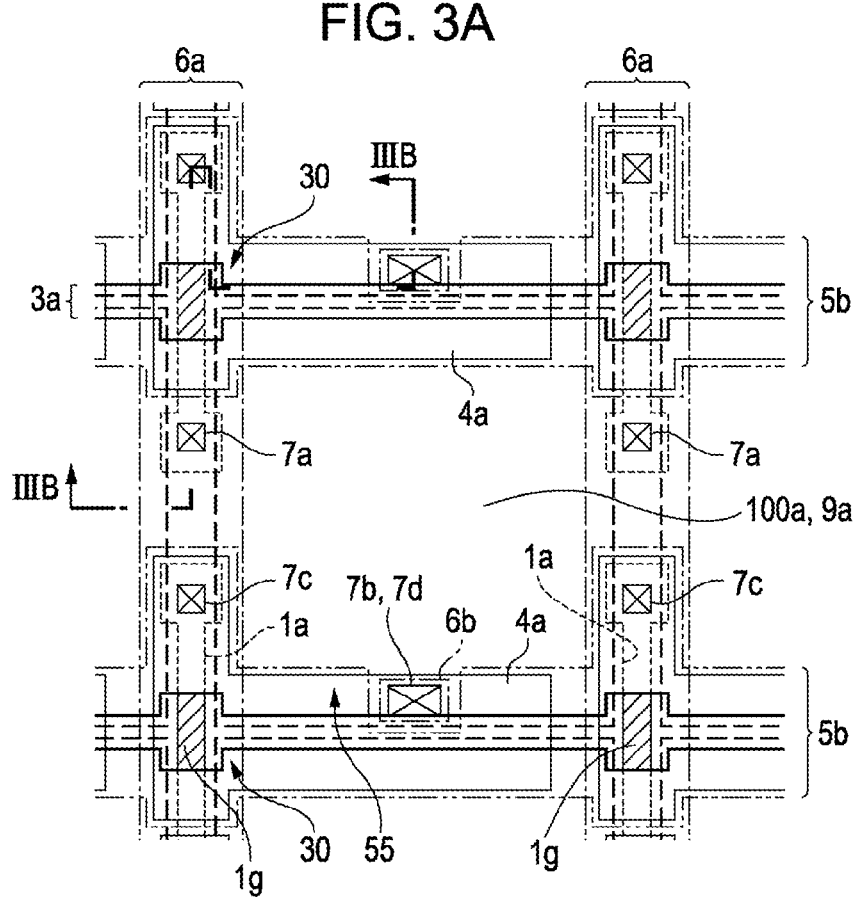
FIG. 3A and FIG. 3B are diagrams illustrating a pixel of the liquid crystal device according to the invention.
Figure 3B:
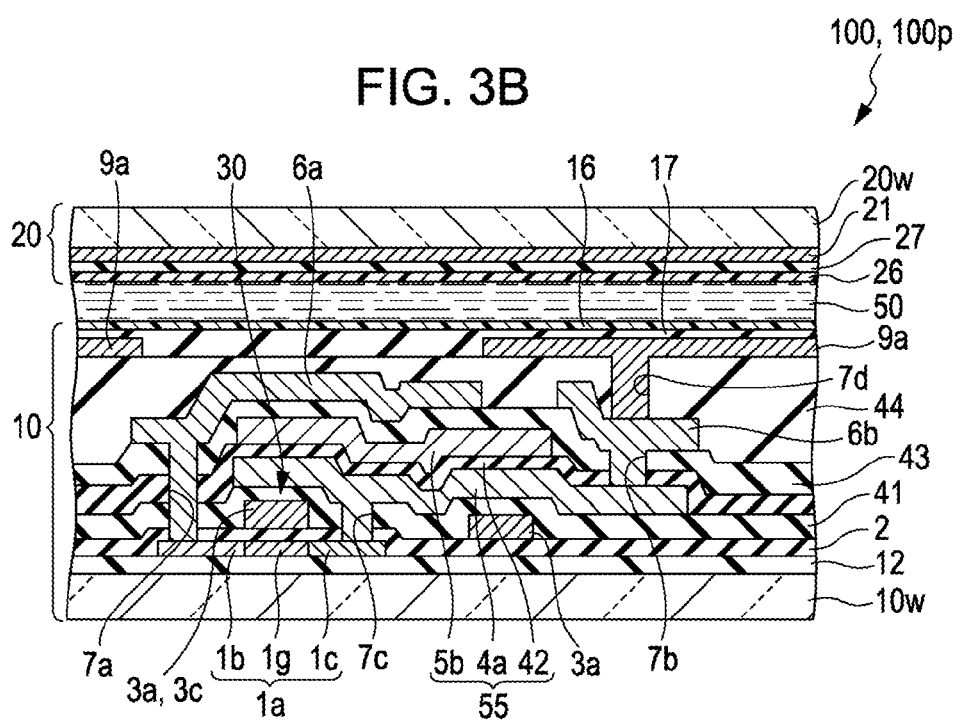

FIG. 3A and FIG. 3B are diagrams illustrating pixels of the liquid crystal device 100 according to the invention, in which FIG. 3A is a plan view of pixels adjacent to each other in the first substrate 10 used in the liquid crystal device 100 according to the invention, and FIG. 3B is a cross-sectional view of the liquid crystal device 100 taken along the line IIIB-IIIB shown in FIG. 3A. In FIG. 3A, a semiconductor layer 1a is represented by a thin and short dotted line, a scanning line 3a is represented by a thick solid line, the data line 6a and a thin film formed together with it are represented by a chain line, a capacity line 5b is represented by a double-dotted chain line, the pixel electrode 9a is represented by a thick and long broken line, and a lower electrode layer 4a is represented by a thin solid line.

As shown in FIG. 3A, on the first substrate 10, the rectangular pixel electrodes 9a are formed for the plurality of pixels 100a, and the data lines 6a and the scanning lines 3a are formed along longitudinal and transverse boundaries of the pixel electrodes 9a. The data lines 6a and the scanning lines 3a linearly extend, and pixel transistors 30 are formed in areas where the data lines 6a and the scanning lines 3a intersect. The capacity lines 5b are formed to overlap with the scanning lines 3a on the first substrate 10. In the embodiment, the capacity lines 5b is provided with a main line part linearly extending to overlap with the scanning lines 3a, and a sub-line part extending to overlap with the data lines 6a at the intersection part of the data lines 6a and the scanning lines 3a.

As shown in FIGS. 3A and 3B, the first substrate 10 mainly includes the pixel electrodes 9a formed on the surface (one side) of the liquid crystal layer 50 side of the transparent substrate body 10w such as a quartz substrate, and a glass substrate, the pixel transistors 30 for pixel switching, and the alignment film 16. The second substrate 20 mainly includes a transparent substrate body 20w such as a quartz substrate and a glass substrate, the common electrode 21 formed on the surface (one side) of the liquid crystal layer 50 side, and the alignment film 26.

In the first substrate 10, each of the plurality of pixels 100a is provided with the pixel transistor 30 having the semiconductor layer 1a. The semiconductor layer 1a is provided with a channel area 1g, a source area 1b, and a drain area 1c opposed to the gate electrode 3c formed of a part of the scanning line 3a with a gate insulating layer 2 interposed therebetween. The source area 1b and the drain area 1c are provided with a low-concentration area and a high-concentration area, respectively. For example, the semiconductor layer 1a is formed of a polycrystal silicon film or the like formed on a transparent basic insulating film 12 formed of a silicon oxide film or the like, for example, on the substrate body 10w. The gate insulating layer 2 is formed of a silicon oxide film or a silicon nitride film formed by a CVD method or the like. The gate insulating layer 2 may have a 2-layer structure of a silicon oxide film formed by thermally oxidizing the semiconductor layer 1a, and a silicon oxide film or a silicon nitride film formed by a CVD method or the like. A conductive polysilicon film, a metal silicide film, or a metal film is used for the scanning lines 3a.

A transparent first interlayer insulating film 41 formed of a silicon oxide film or the like is formed on the upper layer side of the scanning line 3a, and a lower electrode layer 4a is formed on the upper layer of the first interlayer insulating film 41. The lower electrode layer 4a is formed in a substantially L-shape extending along the scanning line 3a and the data line 6a considering the intersection position of the scanning line 3a and the data line 6a as a base point. The lower electrode layer 4a is formed of a conductive polysilicon film, a metal silicide film, a metal film, or the like, and is electrically connected to the drain area 1c through a contact hole 7c.

A transparent dielectric layer 42 formed of a silicon nitride film or the like is formed on the upper layer side of the lower electrode layer 4a. On the upper layer side of the dielectric layer 42, the capacity line 5b (upper electrode layer) is formed to be opposed to the lower electrode layer 4a with the dielectric layer 42 interposed therebetween, and the retention capacity 55 is formed by the capacity line 5b, the dielectric layer 42, and the lower electrode layer 4a. The capacity line 5b is formed of a conductive polysilicon film, a metal silicide film, or a metal film. Herein, the lower electrode layer 4a, the dielectric layer 42, and the capacity line 5b (upper electrode layer) are formed on the upper layer side of the pixel transistor 30, and overlap with the pixel transistor 30 in the plan view.

For this reason, the retention capacity 55 is formed on the upper layer side of the pixel transistor 30, and overlaps with at least the pixel transistor 30 in the plan view.

A transparent second interlayer insulating film 43 formed of a silicon oxide film or the like is formed on the upper layer side of the capacity line 5b, and the data line 6a and the drain electrode 6b are formed on the upper layer of the second interlayer insulating film 43. The data line 6a is electrically connected to the source area 1b through the contact hole 7a. The drain electrode 6b is electrically connected to the lower electrode layer 4a through the contact hole 7b, and is electrically connected to the drain area 1c through the lower electrode layer 4a. The data line 6a and the drain electrode 6b are formed of a conductive polysilicon film, a metal silicide film, a metal film, or the like.

A transparent third interlayer insulating film 44 formed of a silicon oxide film or the like is formed on the upper layer side of the data line 6a and the drain electrode 6b. The third interlayer insulating film 44 is provided with a contact hole 7d connected to the drain electrode 6b. The pixel electrode 9a formed of a transparent conductive film such as ITO (Indium Tin Oxide) as a metal oxide layer is formed on the upper layer of the third interlayer insulating film 44, and the pixel electrode 9a is electrically connected to the drain electrode 6b through the contact hole 7d. In the embodiment, the surface of the third interlayer insulating film 44 is a flat face.

The dummy pixel electrode 9b (not shown in FIG. 3A and FIG. 3B) described with reference to FIG. 2B is formed on the surface of the third interlayer insulating film 44, and the dummy pixel electrode 9b is formed of a transparent conductive film formed together with the pixel electrode 9a.

The alignment film 16 is formed on the surface of the pixel electrode 9a. The alignment film 16 is formed of a resin film such as polyimide or a rhombic vapor-deposited film such as a silicon oxide film. In the embodiment, the alignment film 16 is an inorganic film (vertical alignment film) formed of a rhombic vapor-deposited film such as $SiO_x$ (x<2), $SiO_2$, $TiO_2$, MgO, $Al_2O_3$, $In_2O_3$, $Sb_2O_3$, and $Ta_2O_5$, and a transparent protective film 17 is formed of a silicon oxide film or a silicon nitride film between the alignment film 16 and the pixel electrode 9a. The surface of the protective film 17 is a flat face, and fills the concave portion formed between the pixel electrodes 9a. Accordingly, the alignment film 16 is formed on the flat surface of the protective film 17.

In the second substrate 20, the common electrode 21 formed of a transparent conductive film such as an ITO film is formed on the surface (a face on the side opposed to the first substrate 10) on the liquid crystal layer 50 side of the transparent substrate body 20w such as a quartz substrate and a glass substrate, and the alignment film 26 is formed to cover the common electrode 21. The alignment film 26 is formed of a resin film such as polyimide or a rhombic vapor-deposited film such as a silicon oxide film in the same manner as the alignment film 16. In the embodiment, the alignment film 26 is an inorganic film (vertical alignment film) formed of a rhombic vapor-deposited film such as $SiO_x$ (x<2), $SiO_2$, $TiO_2$, MgO, $Al_2O_3$, $In_2O_3$, $Sb_2O_3$, and $Ta_2O_5$, and a protective film 27 such as a silicon oxide film and a silicon nitride film is formed between the alignment film 26 and the common electrode 21. The surface of the protective film 27 is a flat face, and the alignment film 26 is formed on the flat face. In the alignment films 16 and 26, a nematic liquid crystal compound with negative dielectric anisotropy used in the liquid crystal layer 50 is vertically aligned, and the liquid crystal panel 100p operates as a normally black VA mode.

In the data line driving circuit 101 and the scanning line driving circuit 104 described with reference to FIG. 1, FIG. 2A, and FIG. 2B, a complementary type transistor circuit provided with an N-channel type driving transistor and a P-channel type driving transistor is configured. Herein, the driving transistor is formed using a part of the production process of the pixel transistor 30. For this reason, an area where the data line driving circuit 101 and the scanning line driving circuit 104 are formed on the first substrate 10 also has substantially the same cross-sectional configuration as the cross-sectional configuration shown in FIG. 3B.

Configuration of Inter-Substrate Connection Unit 109 and the Like

Figure 4A:
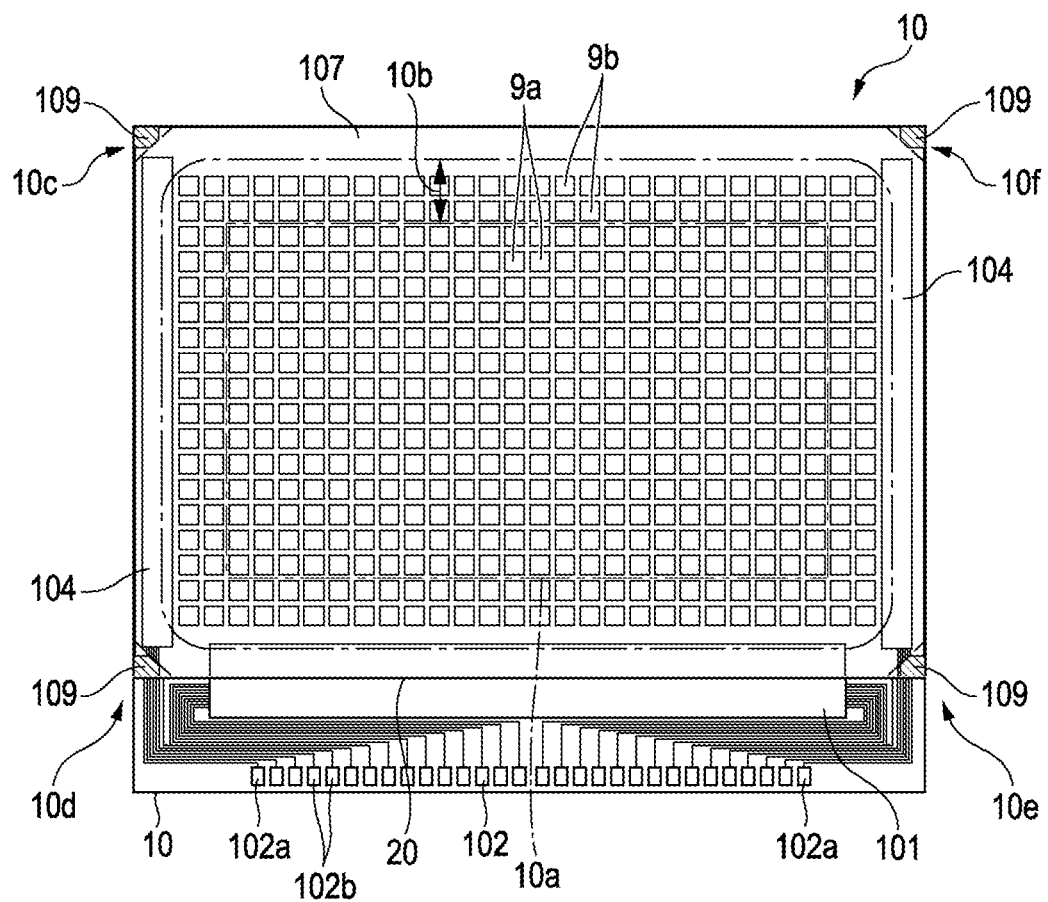
FIG. 4A and FIG. 4B are diagrams illustrating a plan configuration of a first substrate used in the liquid crystal device according to Embodiment 1 of the invention.
Figure 4B:
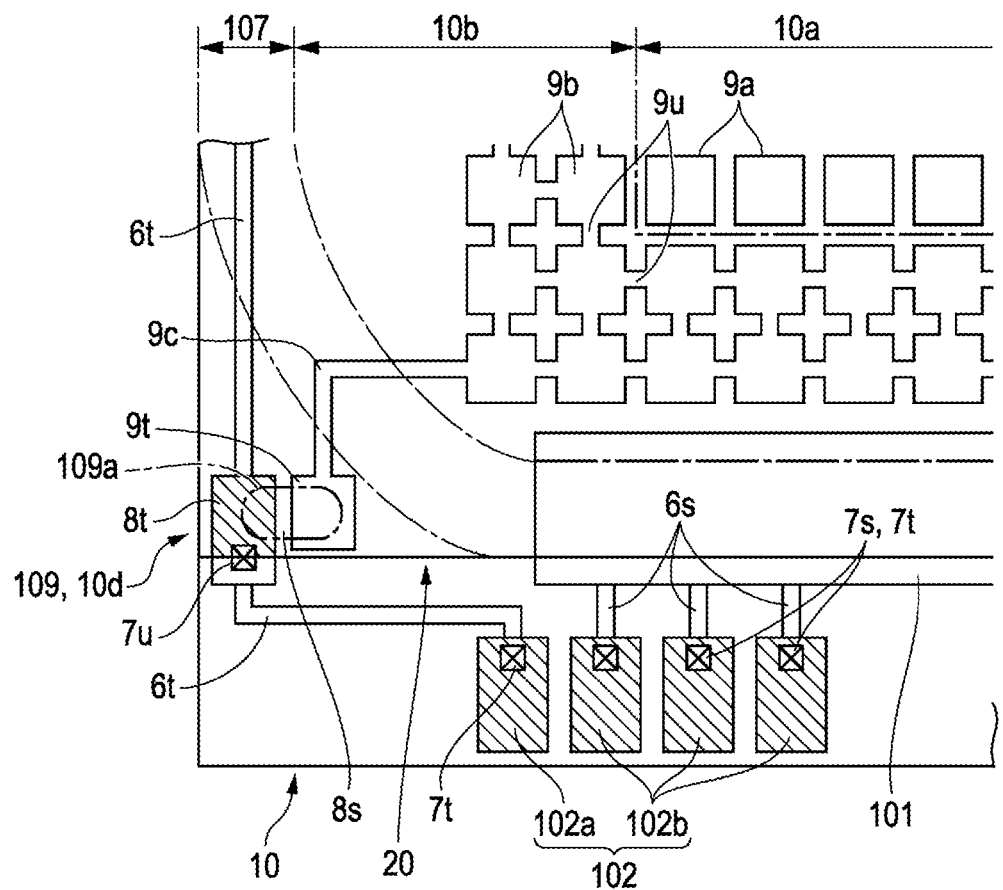
Figure 5A:
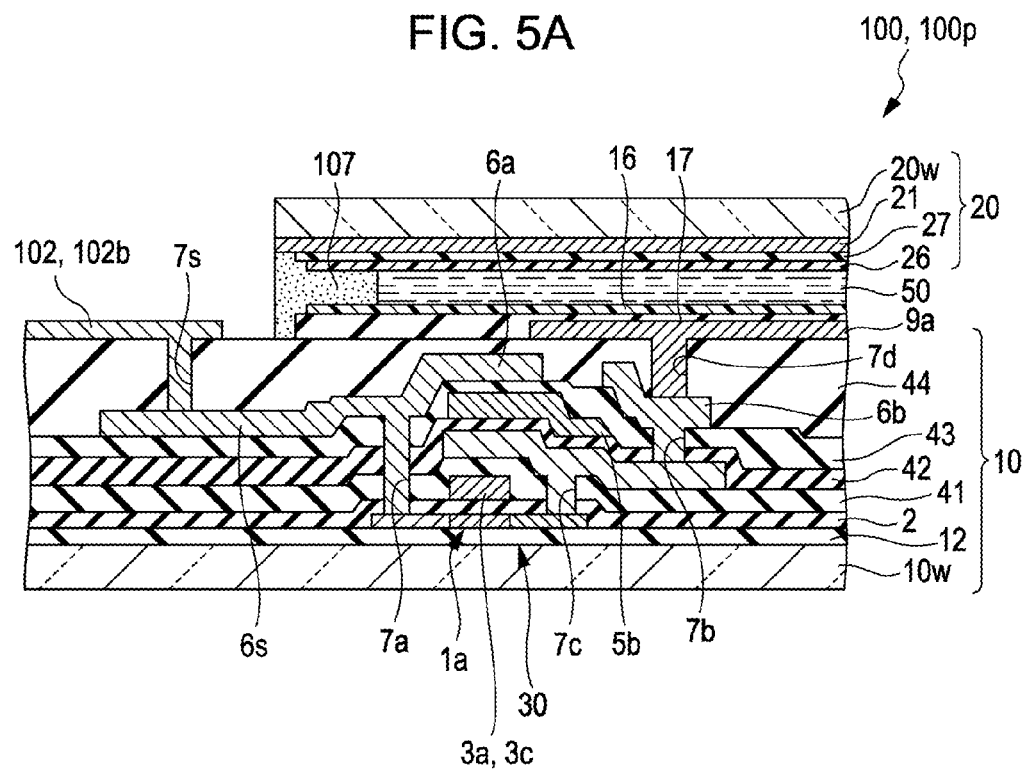
FIG. 5A and FIG. 5B are diagrams illustrating a cross-sectional configuration of the liquid crystal device according to Embodiment 1 of the invention.
Figure 5B:
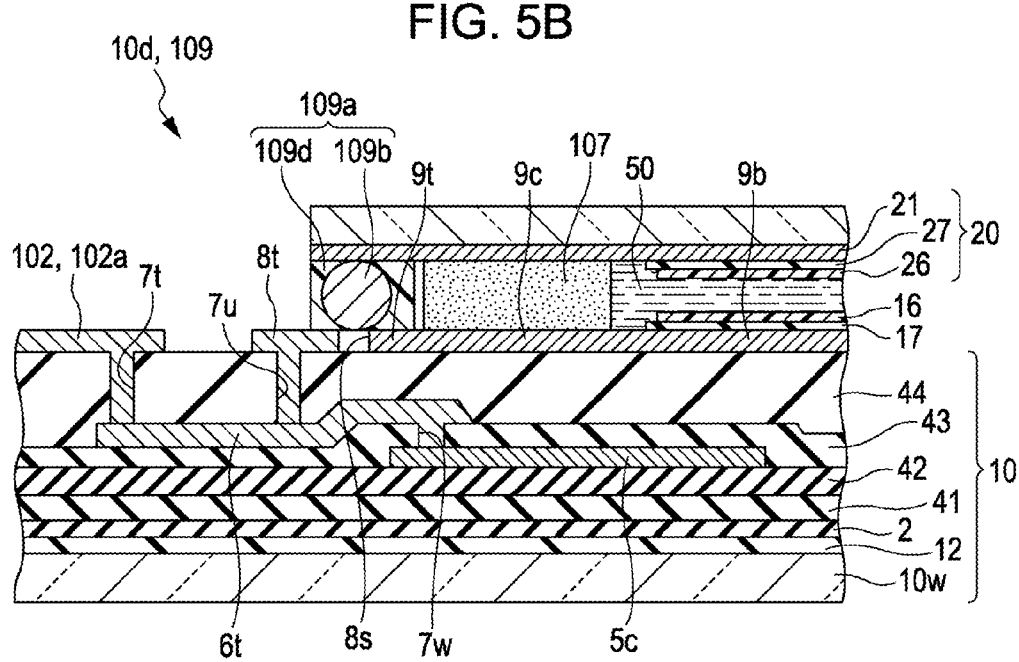
Figure 6:
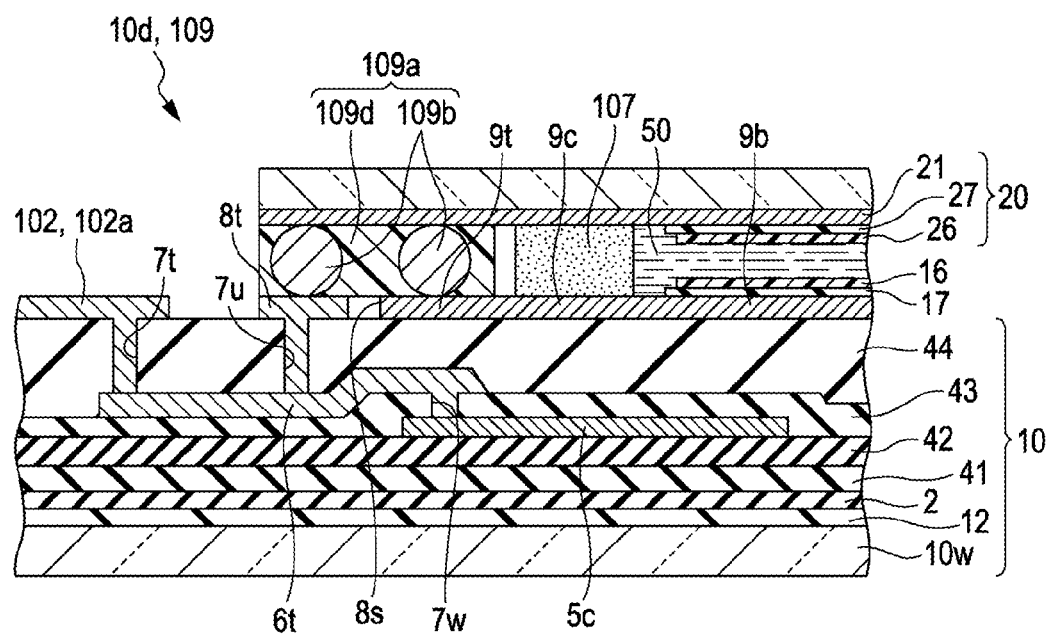
FIG. 6 is a diagram illustrating an electrical connection structure configured by an inter-substrate connection member in the liquid crystal device according to Embodiment 1 of the invention.

FIG. 4A and FIG. 4B are diagrams illustrating a plan configuration of the first substrate 10 used in the liquid crystal device 100 according to Embodiment 1 of the invention, FIG. 4A is a diagram illustrating a layout of the entirety of the electrodes, and FIG. 4B is a diagram enlarging and illustrating one of the angled parts of the second substrate 20. In FIG. 4A and FIG. 4B, small numbers of the pixel electrodes 9a and the dummy pixel electrodes 9b are shown. FIG. 5A and FIG. 5B are diagrams illustrating a cross-sectional configuration of the liquid crystal device 100 according to Embodiment 1 of the invention, FIG. 5A is a diagram schematically illustrating an electrical connection structure of the terminal 102 and the pixel electrode 9a, and FIG. 5B is a diagram schematically illustrating an electrical connection structure of the terminal 102 and the dummy pixel electrode 9b. FIG. 6 is a diagram illustrating an electrical connection structure configured by the inter-substrate connection member 109a in the liquid crystal device 100 according to Embodiment 1 of the invention.

As shown in FIG. 4A and FIG. 4B, in the liquid crystal device 100 of the invention, substantially at the center position of the first substrate 10, a pixel area 10a where the plurality of pixel electrodes 9a is arranged, and a peripheral area 10b pinched by the pixel area 10a and a seal member 107 are provided, and the plurality of dummy pixel electrodes 9b as first substrate side electrodes is formed in the peripheral area 10b. Dummy pixel electrodes 9b adjacent to each other of the plurality of dummy pixel electrodes 9b are connected through a connection portion 9u.

In the dummy pixel electrode 9b with such a configuration and the second substrate 20, supply of common potential Vcom to the common electrode 21 formed as the second substrate side electrode is performed by a first terminal 102a of the terminals 102 shown in FIG. 2A and FIG. 2B, and various signals and the like are input from a second terminal 102b to the data line driving circuit 101 and the scanning line driving circuit 104.

As shown in FIG. 5A, the second terminal 102b is formed of an aluminum film formed on the surface of the third interlayer insulating film 44, and the second terminal 102b is electrically connected to a wiring 6s extending on the surface or the like of the second interlayer insulating film 43 through a contact hole 7s formed in the third interlayer insulating film 44. The second terminal 102b is electrically connected to the pixel electrode 9a through a pixel transistor 30, a driving transistor (not shown in FIG. 5A) of the data line driving circuit, or the like.

As shown in FIG. 4A, FIG. 4B, and FIG. 5B, the first terminal 102a is electrically connected to a wiring 6t extending on the surface or the like of the second interlayer insulating film 43 through a contact hole 7t formed on the third interlayer insulating film 44. The wiring 6t is electrically connected to the common potential line 5c through a contact hole 7w formed in the second interlayer insulating film 43.

Inter-substrate connection portions 109 are formed in four angled parts 10c to 10f of the second substrate 20. In the inter-substrate connection portion 109, a first electrode 8t for inter-substrate connection formed of an aluminum film formed together with the terminal 102 is formed on the surface of the third interlayer insulating film 44, the first electrode 8t for inter-substrate connection is electrically connected to the wiring 6t through the contact hole 7u formed in the third interlayer insulating film 44. For this reason, the first electrode 8t for inter-substrate connection is electrically connected to the first terminal 102a, and is formed of the same kind of conductive film (aluminum film) as the first terminal 102a.

In the inter-substrate connection portion 109, on the surface of the third interlayer insulating film 44, a second electrode 9t for inter-substrate connection is formed at the leading end of an extending portion 9c formed of an ITO film formed together with the dummy pixel electrode 9b, and the second electrode 9t for inter-substrate connection is connected to the dummy pixel electrode 9b. For this reason, the second electrode 9t for inter-substrate connection is electrically connected to the dummy pixel electrode 9b, and the dummy pixel electrode 9b is formed of the same kind of conductive film (ITO film). The first electrode 8t for inter-substrate connection and the second electrode 9t for inter-substrate connection neighbor each other through a narrow slit (gap) 8s.

As described above, in the embodiment, the second electrode 9t for inter-substrate connection and the dummy pixel electrode 9b are formed of a different kind of conductive film from the first terminal 102a and the first electrode 8t for inter-substrate connection. The second electrode 9t for inter-substrate connection and the dummy pixel electrode 9b are electrically connected to each other, and the first terminal 102a and the first electrode 8t for inter-substrate connection are electrically connected to each other. The conductive film (ITO film) constituting the second electrode 9t for inter-substrate connection and the dummy pixel electrode 9b, and the conductive film (aluminum film) constituting the first terminal 102a and the first electrode 8t for inter-substrate connection are separated as patterns on the surface of the same interlayer insulating film (third interlayer insulating film 44) of the first substrate 10.

The inter-substrate connection member 109a is provided over the first electrode 8t for inter-substrate connection and the second electrode 9t for inter-substrate connection between the first substrate 10 and the second substrate 20. The inter-substrate connection member 109a is formed of a conductive particle 109b such as silver particles and a resin component 109d, and the conductive particle 109b comes in contact with both of the first electrode 8t for inter-layer connection and the second electrode 9t for inter-substrate connection over the slit (gap) 8s. The conductive particle 109b also comes in contact with the common electrode 21. Accordingly, in a state where the inter-substrate connection member 109a is not provided, it is electrically insulated on the surface of the interlayer insulating film (third interlayer insulating film 44). However, when the inter-layer connection member 109a is provided over the slit (gap) 8s, the first electrode 8t for inter-substrate connection, the second electrode 9t for inter-substrate connection, and the common electrode 21 are electrically connected to each other by the same inter-substrate connection member 109a. As schematically shown in the drawing, one conductive particle 109b is interposed in the slit (gap) 8s, and thus the first electrode 8t for inter-substrate connection, the second electrode 9t for inter-substrate connection, and the common electrode 21 are electrically connected. However, a plurality of conductive particles electrically connected to each other with respect to the slit (gap) 8s may be interposed.

According to the configuration, the common potential Vcom supplied from the first terminal 102a is applied to the common potential line 5c, and is applied to the common electrode 21 through the first electrode 8t for inter-substrate connection and the conductive particle 109b. The common potential Vcom supplied from the first terminal 102a is applied to the dummy pixel electrode 9b through the first electrode 8t for inter-substrate connection, the conductive particle 109b, and the second electrode 9t for inter-substrate connection. The common potential Vcom supplied from the first terminal 102a is applied to the common electrode 21 through the first electrode 8t for inter-substrate connection and the conductive particle 109b, and then is applied from the common electrode 21 to the dummy pixel electrode 9b through the conductive particle 109b and the second electrode 9t for inter-substrate connection.

In the embodiment, electrically connecting the first electrode 8t for inter-substrate connection, the second electrode 9t for inter-substrate connection, and the common electrode 21 to each other by "the same inter-substrate connection member 109a" means including a configuration in which the electrodes are electrically connected by the other conductive particle 109b as shown in FIG. 6 but the electrodes are electrically connected by the inter-substrate connection member 109a provided at the same part, in addition to a configuration in which the electrodes are electrically connected by the same conductive particle 109b as shown in FIG. 5B.

Method of Producing Liquid Crystal Device 100

Figure 7A:
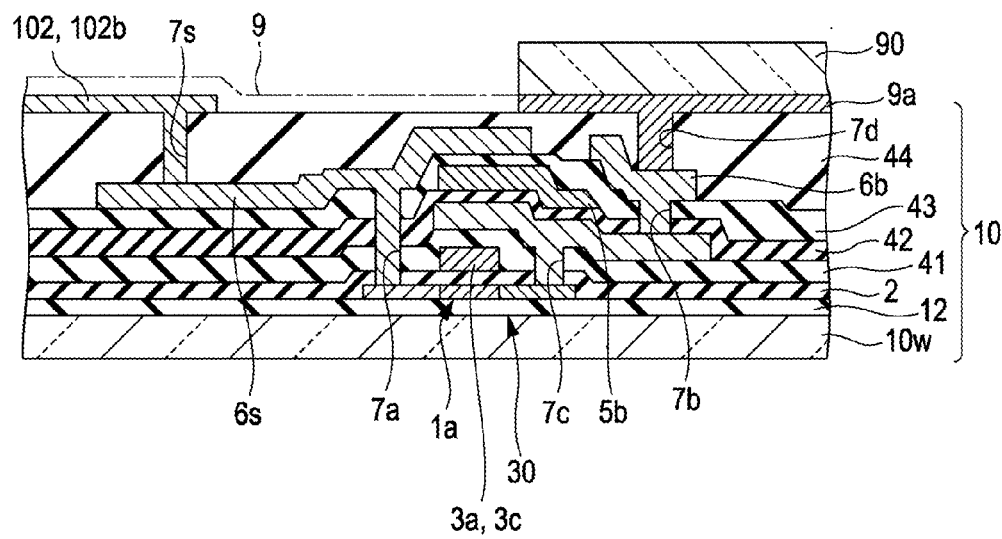
FIG. 7A and FIG. 7B are diagrams illustrating a process of forming a pixel electrode out of processes of producing the liquid crystal device according to Embodiment 1 of the invention.
Figure 7B:
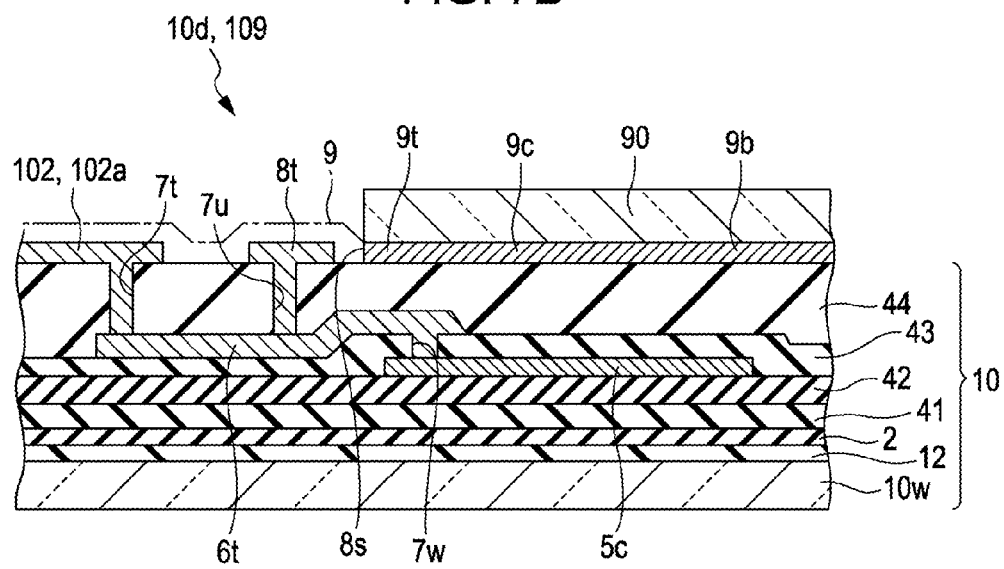

FIG. 7 is a diagram illustrating a process of forming the pixel electrode 9a in a process of producing the liquid crystal device 100 according to Embodiment 1 of the invention, FIG. 7A is a diagram illustrating a process of forming the pixel electrode 9a in the pixel area 10a, and FIG. 7B is a diagram illustrating a process of forming the dummy pixel electrode 9b in the peripheral area 10b.

When the liquid crystal device 100 of the invention is produced, the pixel transistors 30, various kinds of wirings, and the terminals 102 are formed using the known semiconductor process as shown in FIG. 7A and FIG. 7B, and then the pixel electrodes 9a and the dummy pixel electrode 9b are formed. More specifically, the ITO film 9 is formed on the first substrate 10, then a resist mask 90 is formed on the surface of the ITO film 9, and in this state, dry etching is performed on the ITO film 9. Thereafter, the first substrate 10 is brought in contact with an alkaline or acidic stripper to remove the resist mask 90.

In the process, the aluminum film constituting the terminal 102 and the first electrode 8t for inter-substrate connection, and the ITO film constituting the pixel electrode 9a, the dummy pixel electrode 9b, and the extending portion 9c, and the second electrode 9t for inter-substrate connection are exposed on the same interlayer insulating film (third interlayer insulating film 44). The terminal 102 formed of the aluminum film and the first electrode 8t for inter-substrate connection come in contact with the stripper, and the pixel electrode 9a formed of the ITO film, the dummy pixel electrode 9b, the extending portion 9c, and the second electrode 9t for inter-substrate connection come in contact with the stripper.

The standard electrode potential of aluminum is about −1.7 V, the standard electrode potential of ITO is about −0.2 V, and the standard electrode potential of aluminum is lower than that of ITO. Accordingly, when the aluminum film and the ITO film are electrically connected, the aluminum film is eluted into the stripper by the electrochemical corrosion reaction (local battery corrosion reaction). However, in the embodiment, the aluminum film and the ITO film are not electrically connected with low resistance, and thus the electrochemical corrosion reaction of eluting the aluminum film does not occur.

That is, in FIG. 7B, the first terminal 102a and the first electrode 8t for inter-substrate connection are only formed of the aluminum film, and the second electrode 9t for inter-substrate connection and the dummy pixel electrode 9b are formed of the ITO film. However, the first electrode 8t (aluminum film) for inter-substrate connection and the second electrode 9t (ITO film) for inter-substrate connection are insulated by the slit (gap) 8s, and are not electrically connected. Accordingly, the electrochemical corrosion reaction of eluting the second terminal 102b in the stripper does not occur.

The second terminal 102b shown in FIG. 7A is electrically connected to the pixel electrode 9a, but the second terminal 102b and the pixel electrode 9a are electrically connected through the pixel transistor 30 or the driving transistor of the data line driving circuit, and are not electrically connected with low resistance. Accordingly, the electrochemical corrosion reaction of eluting the second terminal 102b in the stripper does not occur.

Even when the wet etching is performed on the patterning of the ITO film 9, the same is applied. That is, in the proceeding course of the wet etching, the terminal 102 and the first electrode 8t for inter-substrate connection formed of the aluminum film come in contact with etching liquid, and the pixel electrode 9a, the dummy pixel electrode 9b, the extending portion 9c, and the second electrode 9t formed of the ITO film come in contact with the etching liquid. For this reason, when the aluminum film and the ITO film are electrically connected with low resistance, the aluminum film is eluted into the stripper by the electrochemical corrosion reaction (local battery corrosion reaction). However, in the embodiment, since the aluminum film and the ITO film are not electrically connected with low resistance, the electrochemical corrosion reaction of eluting the aluminum film in the etching liquid does not occur.

Changing the process sequence, even when the pixel electrode 9a and the like are formed of ITO film and then the terminal 102 is formed of the aluminum film, and when the aluminum film and the ITO film are electrically connected, the electrochemical corrosion reaction (local battery corrosion reaction) occurs. However, according to the configuration of the embodiment, since the aluminum film and the ITO film are not electrically connected with low resistance, the electrochemical corrosion reaction of eluting the aluminum film does not occur.

Main Effect of Embodiment

As described above, in the liquid crystal device 100 of the invention, the first terminal 102a and the first electrode 8t for inter-substrate connection electrically connected to the first terminal 102a are formed on one face side of the first substrate 10, but the first terminal 102a and the first electrode 8t for inter-substrate connection are configured by the same kind of conductive film (aluminum film). The dummy pixel electrode 9b (first substrate side electrode) and the second electrode 9t for inter-substrate connection electrically connected to the dummy pixel electrode 9b are formed on one face side of the first substrate 10, but the dummy pixel electrode 9b and the second electrode 9t for inter-substrate connection are configured by the same kind of conductive film (ITO film). The aluminum film constituting the first terminal 102a and the first electrode 8t for inter-substrate connection, and the ITO film constituting the dummy pixel electrode 9b and the second electrode 9t for inter-substrate connection are different in standard electrode potential, but they are insulated in the independent state of the first substrate 10. For this reason, in the process of producing the first substrate 10, when the stripping of the resist mask by the stripper or the wet process using electrolysis solution such as wet etching is performed, and even when the first terminal 102a, the first electrode 8t for inter-substrate connection, the dummy pixel electrode 9b, and the second electrode 9t for inter-substrate connection come in contact with the same electrolysis solution, the electrochemical corrosion reaction does not occur. Accordingly, the problem in which the conductive film (aluminum film) with low standard electrode potential is eluted into the electrolysis solution does not occur. Therefore, it is possible to form the terminal 102, the first electrode 8t for inter-substrate connection, the dummy pixel electrode 9b, and the second electrode 9t for inter-substrate connection, with high precision in size and high precision in shape.

In the independent state of the first substrate 10, the conductive film constituting the first terminal 102a and the first electrode 8t for inter-substrate connection, and the conductive film constituting the dummy pixel electrode 9b and the second electrode 9t for inter-substrate connection are insulated. However, when the inter-substrate connection member 109a is provided between the first substrate 10 and the second substrate 20, the first electrode 8t for inter-substrate connection, the second electrode 9t for inter-substrate connection, and the common electrode 21 (second substrate side electrode) are electrically connected by the inter-substrate connection member 109a. Therefore, it is possible to supply the common potential Vcom applied to the first terminal 102a, to the dummy pixel electrode 9b and the common electrode 21.

In the embodiment, the first electrode 8t for inter-substrate connection and the second electrode 9t for inter-substrate connection are provided at the positions adjacent to each other, and the first electrode 8t for inter-substrate connection, the second electrode 9t for inter-substrate connection, and the common electrode 21 are electrically connected to each other through the same inter-substrate connection member 109a. For this reason, it is possible to perform the inter-substrate connection using the inter-substrate connection member 109a in a narrow area.

The first electrode 8t for inter-substrate connection and the second electrode 9t for inter-substrate connection are close to each other. For this reason, the first electrode 8t for inter-substrate connection, the second electrode 9t for inter-substrate connection, and the common electrode 21 come in contact with the same conductive particle 109b included in the inter-substrate connection member 109a. Therefore, it is possible to reliably and electrically connect the first electrode 8t for inter-substrate connection, the second electrode 9t for inter-substrate connection, and the common electrode 21 through the conductive particle 109b.

Embodiment 2

Figure 8:
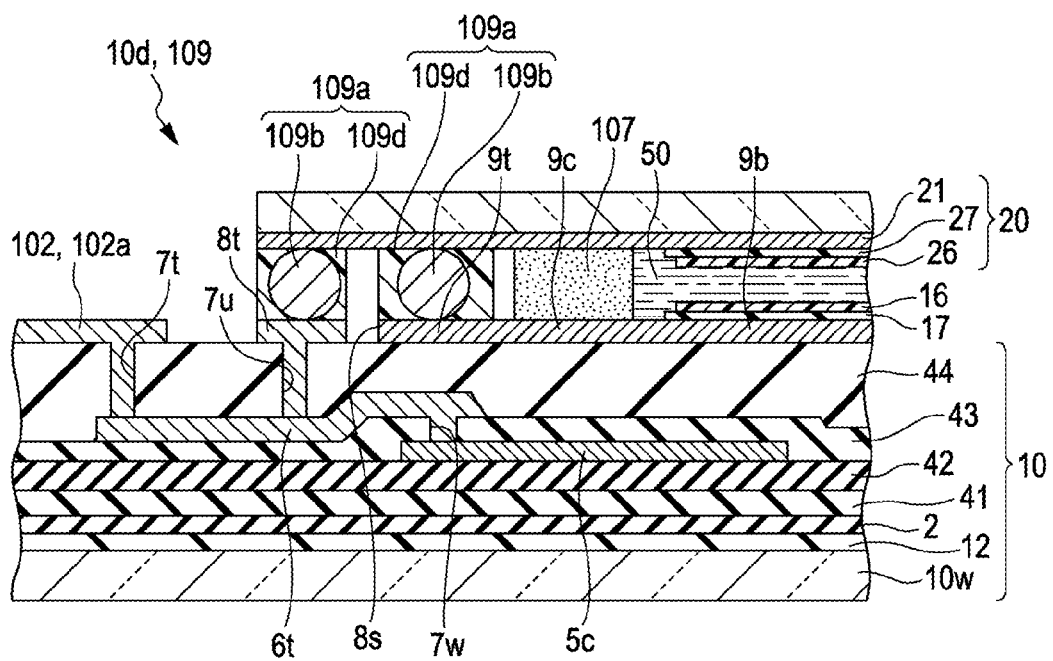
FIG. 8 is a diagram illustrating an electrical connection structure between a terminal and a dummy pixel electrode in a liquid crystal device according to Embodiment 2 of the invention.

FIG. 8 is a diagram schematically illustrating an electrical connection structure of the terminal 102 and the dummy pixel electrode 9b in the liquid crystal device 100 according to Embodiment 2 of the invention. Since a basic configuration of the embodiment is the same as that of Embodiment 1, the same reference numerals and signs are given to the common parts, and the description thereof is omitted.

As shown in FIG. 8, also in the liquid crystal device 100 of the embodiment, the conductive film (ITO film) constituting the second electrode 9t for inter-substrate connection and the dummy pixel electrode 9b, and the conductive film (aluminum film) constituting the first terminal 102a and the first electrode 8t for inter-substrate connection are insulated in the same manner as Embodiment 1. Accordingly, in the process of producing the first substrate 10, when the stripping of the resist mask by the stripper or the wet process using electrolysis solution such as wet etching is performed, and even when the first terminal 102a, the first electrode 8t for inter-substrate connection, the dummy pixel electrode 9b, and the second electrode 9t for inter-substrate connection come in contact with the same electrolysis solution, the electrochemical corrosion reaction does not occur. Accordingly, the problem in which the conductive film (aluminum film) with low standard electrode potential is eluted into the electrolysis solution does not occur.

In the independent state of the first substrate 10, the conductive film constituting the first terminal 102a and the first electrode 8t for inter-substrate connection, and the conductive film constituting the dummy pixel electrode 9b and the second electrode 9t for inter-substrate connection are insulated. However, in the embodiment, the inter-substrate connection member 109a is provided at each of a position overlapping the first electrode 8t for inter-substrate connection and a position overlapping the second electrode 9t for inter-substrate connection between the first substrate 10 and the second substrate 20. For this reason, the first electrode 8t for inter-substrate connection and the common electrode 21 are electrically connected by the inter-substrate connection member 109a, and the common electrode 21 and the second electrode 9t for inter-substrate connection are electrically connected by the other inter-substrate connection 109a. For this reason, it is possible to supply the common potential Vcom applied to the first terminal 102a, to the dummy pixel electrode 9b and the common electrode 21.

Embodiment 3

Figure 9A:
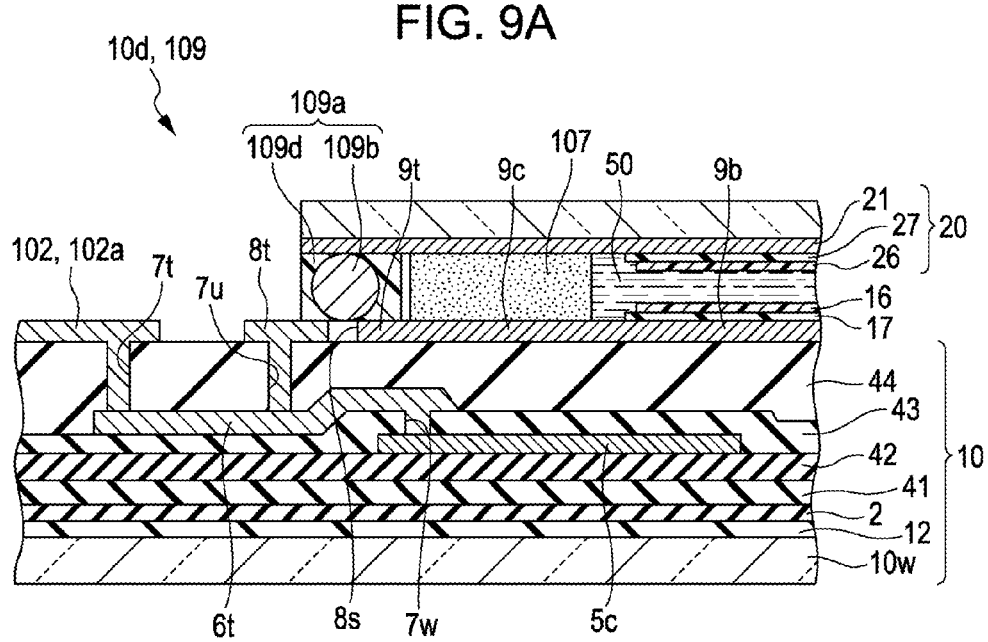
FIG. 9A and FIG. 9B are diagrams schematically illustrating an electrical connection structure among a terminal, a dummy pixel electrode, and the like in a liquid crystal device according to Embodiment 3 of the invention.
Figure 9B:
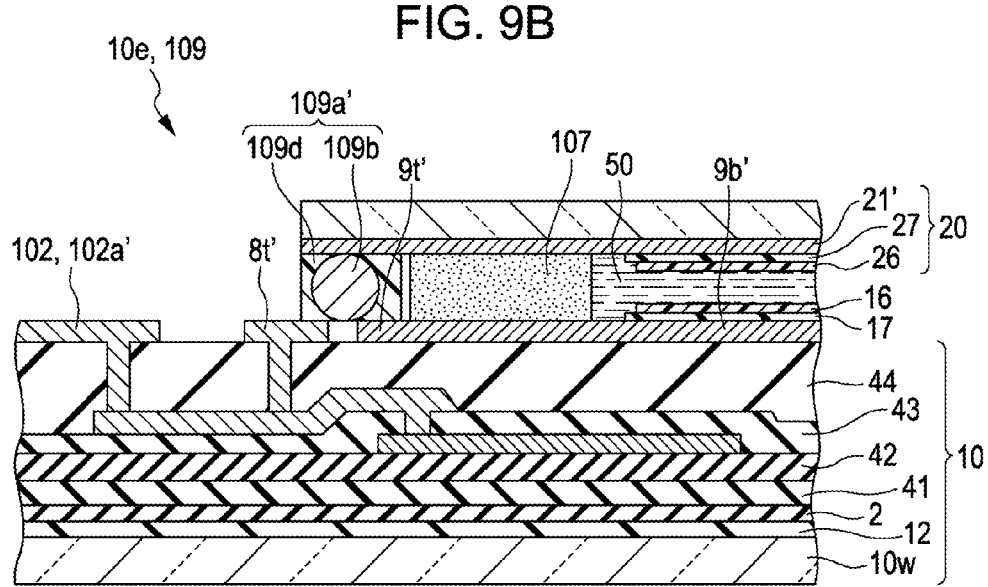

FIG. 9A and FIG. 9B are diagrams schematically illustrating an electrical connection structure of the terminal 102 and a dummy pixel electrode 9b' in the liquid crystal device 100 according to Embodiment 3 of the invention, FIG. 9A is a diagram illustrating a configuration of an inter-substrate connection portion and the like provided in the angled part 10d, and FIG. 9B is a diagram illustrating a configuration of an inter-substrate connection portion and the like provided in the angled part 10e. Since a basic configuration of the embodiment is the same as that of Embodiment 1, the same reference numerals and signs are given to the common parts, and the description thereof is omitted.

In the embodiment, as will be described hereinafter, a plurality of sets of the first terminal 102a, the first electrode 8t for inter-substrate connection, the second electrode 9t for inter-substrate connection, the first substrate side electrode (dummy pixel electrode 9b), the second substrate side electrode (common electrode 21), and the inter-substrate connection member 109a, to which different potentials are applied, are provided on the first substrate 10.

More specifically, as shown in FIG. 9A, also in the liquid crystal device 100 of the embodiment, at the angled part 10d, the conductive film (ITO film) constituting the second electrode 9t for inter-substrate connection and the dummy pixel electrode 9b, and the conductive film (aluminum film) constituting the first terminal 102a and the first electrode 8t for inter-substrate connection are insulated in the same manner as Embodiment 1. In the independent state of the first substrate 10, the conductive film constituting the first terminal 102a and the first electrode 8t for inter-substrate connection, and the conductive film constituting the dummy pixel electrode 9b and the second electrode 9t for inter-substrate connection are insulated. However, in the embodiment, at the angled part 10d, the inter-substrate connection member 109a is provided over the first electrode 8t for inter-substrate connection and the second electrode 9t for inter-substrate connection between the first substrate 10 and the second substrate 20. For this reason, the first electrode 8t for inter-substrate connection and the common electrode 21 are electrically connected by the inter-substrate connection member 109a, and the common electrode 21 and the second electrode 9t for inter-substrate connection are electrically connected by the other inter-substrate connection 109a. For this reason, it is possible to supply the common potential Vcom applied to the first terminal 102a, to the dummy pixel electrode 9b and the common electrode 21.

In the embodiment, as shown in FIG. 9B, at the angled part 10e, another first terminal 102a', another first electrode 8t' for inter-substrate connection, another second electrode 9t' for inter-substrate connection, another first substrate side electrode 9b', another second substrate side electrode 21', and another inter-substrate connection member 109a' are provided on the first substrate 10, and a potential other than the common potential Vcom is applied to the first terminal 102a'. The first terminal 102a' and the first electrode 8t' for inter-substrate connection are formed of the aluminum film, and the second electrode 9t' for inter-substrate connection and the first substrate side electrode 9b' are formed of the ITO film. In the embodiment, the second substrate side electrode 21' is also formed of the ITO film.

In this case, the first substrate side electrode 9b' and the second substrate side electrode 21' are formed of, for example, ionic impurity removing electrodes formed together with the dummy pixel electrode 9b. That is, ionic impurities mixed at the time of liquid crystal injection or ionic impurities eluted from the seal member exist in the liquid crystal, and the ionic impurities cohere at the end portion of the pixel area 10a by driving the liquid crystal to cause deterioration in display quality. However, in the embodiment, the potential other than the common potential Vcom is applied to the first substrate side electrode 9b' and the second substrate side electrode 21'. For this reason, since a transverse electric field is formed between the dummy pixel electrode 9b and the first substrate side electrode 9b' and between the common electrode 21 and the second substrate side electrode 21', the ionic impurities are drawn in and can be kept in a cohered state. Therefore, since the ionic impurities do not come out in the pixel area 10a, it is possible to reliably prevent the display quality from deteriorating due to the ionic impurities.

Also in the liquid crystal device 100 with such a configuration, in the process of producing the first substrate 10, when the stripping of the resist mask by the stripper or the wet process using electrolysis solution such as wet etching is performed, and even when the first terminal 102a', the first electrode 8t' for inter-substrate connection, the dummy pixel electrode 9b', and the second electrode 9t' for inter-substrate connection come in contact with the same electrolysis solution, the electrochemical corrosion reaction does not occur. Accordingly, the problem in which the conductive film (aluminum film) with low standard electrode potential is eluted into the electrolysis solution does not occur.

Improvement Example of Embodiment 1

Figure 10:
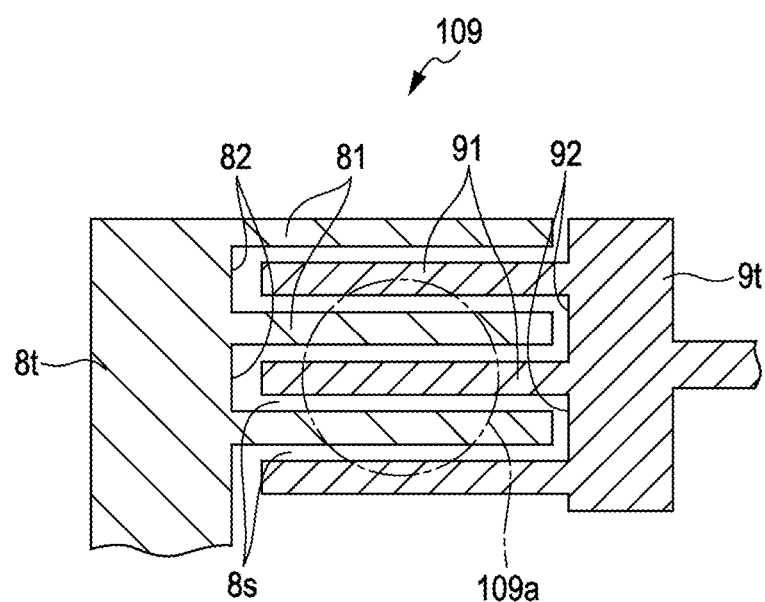
FIG. 10 is a diagram schematically illustrating a plan configuration of an inter-substrate connection portion in a liquid crystal device according to an improvement example of Embodiment 1 or the like of the invention.

FIG. 10 is a diagram schematically illustrating a plan configuration of the inter-substrate connection portion 109 in the liquid crystal device 100 according to an improvement example of Embodiment 1 or the like of the invention.

In Embodiment 1 and the like, in the inter-substrate connection portion 109, both of the first electrode 8t for inter-substrate connection and the second electrode 9t for inter-substrate connection have a rectangular shape of adjacent to each other through the slit (gap) 8s. However, the first electrode 8t for inter-substrate connection and the second electrode 9t for inter-substrate connection shown in FIG. 10 may employ a configuration provided with a concave portion in which a convex portion is wedged from one side electrode toward the other side electrode. More specifically, the first electrode 8*t* for inter-substrate connection is provided with a plurality of convex portions 8*l* protruding toward the second electrode 9*t* for inter-substrate connection, and concave portions 82 are provided between the convex portions 8*l*. Meanwhile, the second electrode 9*t* for inter-substrate connection is provided with a plurality of convex portions 9*l* protruding toward the concave portions 82 of the first electrode 8*t* for inter-substrate connection, and concave portions 92 in which the convex portion 8*l* are wedged are provided between the convex portions 9*l*. The first electrode 8*t* for inter-substrate connection and the second electrode 9*t* for inter-substrate connection neighbor each other through the slit (gap) 8*s*.

When such a pectinate shape is employed, when the first electrode 8*t* for inter-substrate connection and the second electrode 9*t* for inter-substrate connection are electrically connected by the same inter-substrate connection member 109*a* provided at one part, and even when the position for providing the inter-substrate connection member 109*a* slightly deviates, it is possible to reliably and electrically connect the first electrode 8*t* for inter-substrate connection and the second electrode 9*t* for inter-substrate connection.

Other Embodiments

In the embodiment described above, the pixel electrode 9*a* and the like are formed of the transparent conductive film such as ITO, but the pixel electrode 9*a* and the like may be formed of a reflective conductive film such as aluminum and silver to configure the liquid crystal device 100 as a reflection type.

In the embodiment described above, the combination of aluminum and ITO has been described as the other kind of conductive film. However, when a combination of metals described as follows (silver (standard electrode potential=+0.80 V), copper (standard electrode potential=+0.34 V), and nickel (standard electrode potential=−0.26 V)) and ITO, a combination of the metals or aluminum and IZO (Indium Zinc Oxide), and a combination of the metals and aluminum are employed, the invention may be applied as different kinds of conductive films. In the embodiment described above, the first substrate side electrode is the dummy pixel electrode 9*b*, and the second substrate side electrode is the common electrode 21. However, when one side electrode is formed in a state where the other side electrode is exposed, and when the first substrate side electrode and the second substrate side electrode are electrodes other than the electrode described above, the invention may be applied.

Example of Mounting on Electronic Apparatus

Figure 11A:
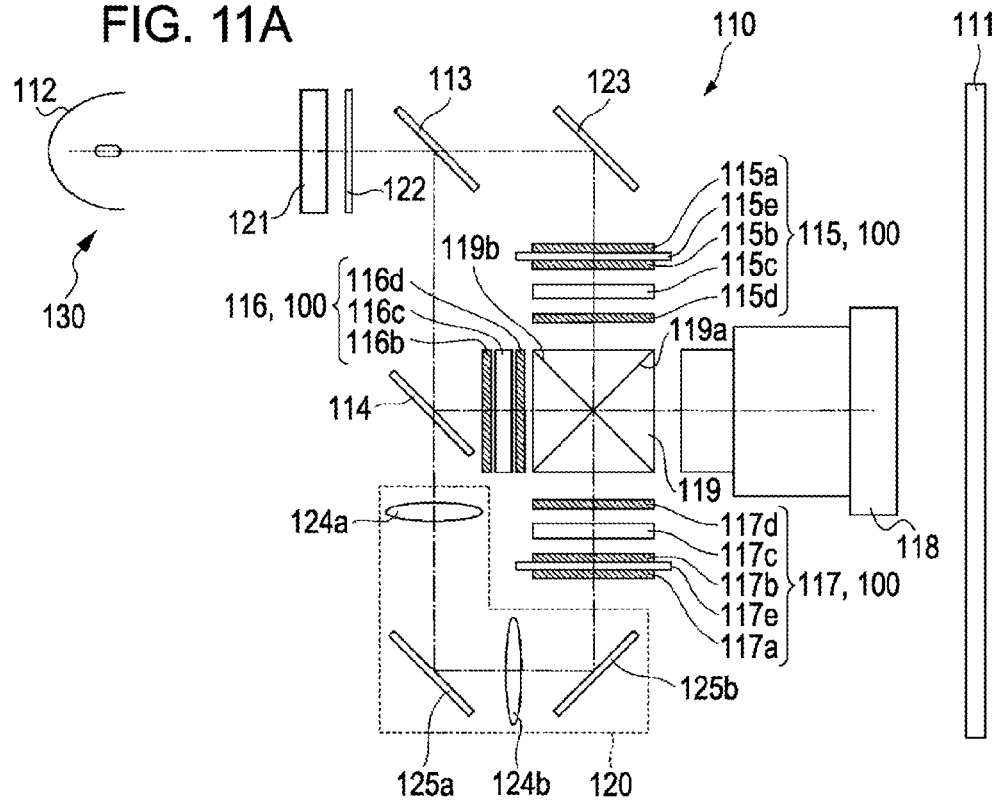
FIG. 11A and FIG. 11B are diagrams illustrating a schematic configuration of a projection-type display device using the liquid crystal device according to the invention.
Figure 11B:
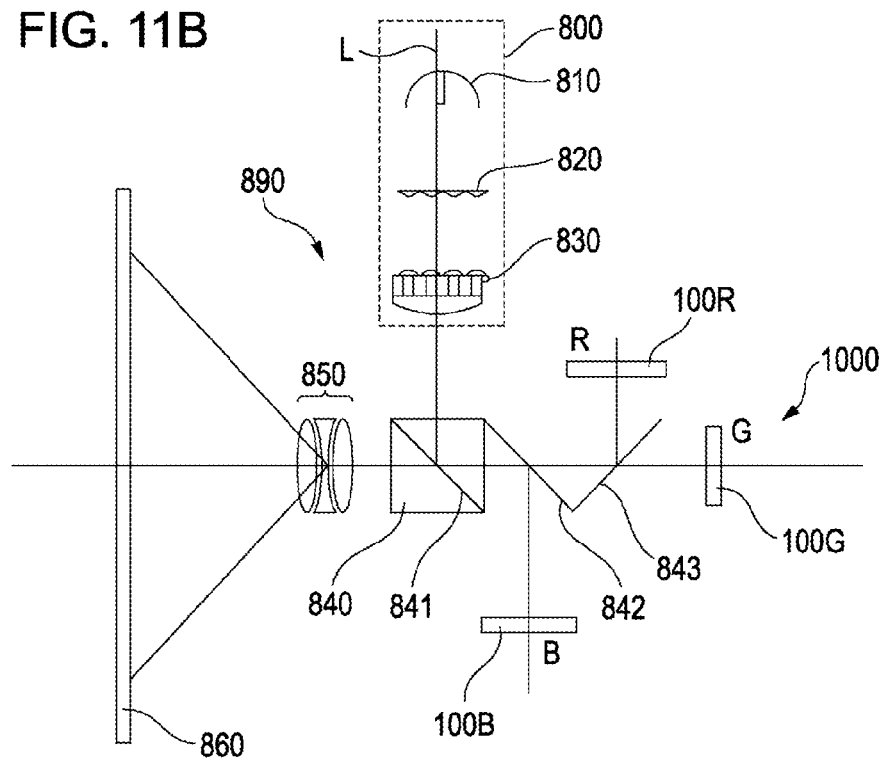

An electronic apparatus to which the liquid crystal device 100 according to the embodiment described above is applied will be described. FIG. 11A and FIG. 11B are diagrams illustrating a schematic configuration of a projection-type display device using the liquid crystal device according to the invention, FIG. 11A is a diagram illustrating a projection-type display apparatus using the transparent-type liquid crystal device 100, and FIG. 11B is a diagram illustrating a projection-type display apparatus using the transparent-type liquid crystal device 100.

First Example of Projection-Type Display Apparatus

The projection-type display device 110 shown in FIG. 11A is a so-called projection-type display apparatus in which a screen 111 provided on an observer side is irradiated with light to observe the light reflected from the screen 111. The projection-type display device 110 is provided with a light source unit 130 having a light source 112, dichroic mirrors 113 and 114, liquid crystal light valves 115 to 117 (liquid crystal device 100), a projection optical system 118, a cross dichroic prism 119, and a relay system 120.

The light source 112 is formed of an extra high pressure mercury lamp supplying light including red light, green light, and blue light. The dichroic mirror 113 allows the red light from the light source 112 to pass, and reflects the green light and the blue light. The dichroic mirror 114 allows the blue light between the green light and the blue light reflected from the dichroic mirror 113 to pass, and reflects the green light. As described above, the dichroic mirrors 113 and 114 constitute a color separation optical system that separates the light output from the light source 112 into red light, green light, and blue light.

An integrator 121 and a polarization conversion element 122 are provided between the dichroic mirror 113 and the light source 112 in order from the light source 112. The integrator 121 makes the distribution of illumination intensity of the light irradiated from the light source 112 uniform. The polarization conversion element 122 makes the light from the light source 112 into polarized light having a specific vibration direction such as s-polarized light.

The liquid crystal light valve 115 is the transparent-type liquid crystal device 100 that modulates the red light passing through the dichroic mirror 113 and reflected from the reflective mirror 123 according to an image signal. The liquid crystal light valve 115 is provided with a λ/2 differential phase plate 115*a*, a first polarization plate 115*b*, a liquid crystal panel 115*c*, and a second polarization plate 115*d*. The red light input to the liquid crystal light valve 115 is s-polarized light, since the polarization of light is not changed even when it passes through the dichroic mirror 113.

The λ/2 differential phase plate 115*a* is an optical element that converts the s-polarized light input to the liquid crystal light valve 115 into p-polarized light. The first polarization plate 115*b* is a polarization plate that blocks the s-polarized light and allows the p-polarized light to pass. The liquid crystal panel 115*c* converts the p-polarized light into s-polarized light (circularly polarized light or elliptically polarized light in a case of a halftone) by modulation according to an image signal. The second polarization plate 115*d* is a polarization plate that blocks the p-polarized light and allows the s-polarized light to pass. Accordingly, the liquid crystal light valve 115 modulates the red light according to an image signal, and outputs the modulated red light toward the cross dichroic prism 119.

The λ/2 differential phase plate 115*a* and the first polarization plate 115*b* are provided in a state of coming in contact with a transparent glass plate 115*e* which does not convert the polarized light, and thus it is possible to prevent the λ/2 differential phase plate 115*a* and the first polarization plate 115*b* from being strained by generated heat.

The liquid crystal light valve 116 is the transparent-type liquid crystal device 100 that modulates the green light reflected from the dichroic mirror 113 and then reflected from the dichroic mirror 114 according to an image signal. The liquid crystal light valve 116 is provided with a first polarization plate 116*b*, a liquid crystal panel 116*c*, and a second polarization plate 116*d* in the same manner as the liquid crystal light valve 115. The green light input to the liquid crystal light valve 116 is s-polarized light reflected and input from the dichroic mirrors 113 and 114. The first polarization plate 116*b* is a polarization plate that blocks the p-polarized light and allows the s-polarized light to pass. The liquid crystal panel 116*c* converts the s-polarized light into p-polarized light (circularly polarized light or elliptically polarized light in a case of a halftone) by modulation according to an image signal. The second polarization plate 116*d* is a polarization plate that blocks the s-polarized light and allows the p-polarized light to pass. Accordingly, the liquid crystal light valve 116 modulates the green light according to an image signal, and outputs the modulated green light toward the cross dichroic prism 119.

The liquid crystal light valve 117 is the transparent-type liquid crystal device 100 that modulates the blue light reflected from the dichroic mirror 113, passing through the dichroic mirror 114, and then passing through the relay system 120 according to an image signal. The liquid crystal light valve 117 is provided with a λ/2 differential phase plate 117a, a first polarization plate 117b, a liquid crystal panel 117c, and a second polarization plate 117d like the liquid crystal light valves 115 and 116. The blue light input to the liquid crystal light valve 117 is reflected from the dichroic mirror 113, passes through the dichroic mirror 114, and then is reflected from two reflective mirrors 125a and 125b to be described later of the relay system 120, thereby being s-polarized light.

The λ/2 differential phase plate 117a is an optical element that converts the s-polarized light input to the liquid crystal light valve 117 into p-polarized light. The first polarization plate 117b is a polarization plate that blocks the s-polarized light and allows the p-polarized light to pass. The liquid crystal panel 117c converts the p-polarized light into s-polarized light (circularly polarized light or elliptically polarized light in a case of a halftone) by modulation according to an image signal. The second polarization plate 117d is a polarization plate that blocks the p-polarized light and allows the s-polarized light to pass. Accordingly, the liquid crystal light valve 117 modulates the blue light according to an image signal, and outputs the modulated blue light toward the cross dichroic prism 119. The λ/2 differential phase plate 117a and the first polarization plate 117b are provided in a state of coming into contact with a glass plate 117e.

The relay system 120 is provided with relay lenses 124a and 124b and reflective mirrors 125a and 125b. The relay lenses 124a and 124b are provided to prevent light loss caused by a long light path of the blue light. The relay lens 124a is provided between the dichroic mirror 114 and the reflective mirror 125a. The relay lens 124b is provided between the reflective mirrors 125a and 125b. The reflective mirror 125a is provided to reflect the blue light passing through the dichroic mirror 114 and output from the relay lens 124a, toward the relay lens 124b. The reflective mirror 125b is provided to reflect the blue light output from the relay lens 124b toward the liquid crystal light valve 117.

The cross dichroic prism 119 is a color synthesis optical system in which two dichroic films 119a and 119b are orthogonally provided in an X-shape. The dichroic film 119a is a film that reflects the blue light and allows the green light to pass, and the dichroic film 119b is a film that reflects the red light and allows the green light to pass. Accordingly, the cross dichroic prism 119 synthesizes the red light, the green light, and the blue light modulated by the liquid crystal light valves 115 to 117, and outputs them toward the projection optical system 118.

The light input from the liquid crystal light valves 115 and 117 to the cross dichroic prism 119 is s-polarized light, and the light input from the liquid crystal light valve 116 to the cross dichroic prism 119 is p-polarized light. As described above, the light input to the cross dichroic prism 119 is different kinds of polarized light, and thus it is possible to effectively synthesize the light input from the liquid crystal light values 115 to 117 with the cross dichroic prism 119. Generally, the dichroic films 119a and 119b are excellent in reflective characteristics of s-polarized light. For this reason, the red light and the blue light reflected from the dichroic films 119a and 119b is s-polarized light, and the green light passing through the dichroic films 119a and 119b is p-polarized light. The projection optical system 118 is provided with a projection lens (not shown), and projects the light synthesized by the cross dichroic prism 119 onto the screen 111.

Second Example of Projection-Type Display Apparatus

In a projection-type display apparatus 1000 shown in FIG. 11B, a light source unit 890 has a polarization lighting device 800 provided with a light source 810, an integrator lens 820, and a polarization conversion element 830 along a system optical axis L. The light source unit 890 is provided with a polarization beam splitter 840 that reflects S-polarization light flux output from the polarization lighting device 800 by an S-polarization light flux reflection face 841, a dichroic mirror 842 that separates the blue light component (B) of the light reflected from the S-polarization light flux reflection face 841 of the polarization beam splitter 840, and a dichroic mirror 843 that reflects and separates the red light component (R) of the light flux after separating the blue light, along the system optical axis L.

The projection-type display apparatus 1000 is provided with three reflection-type liquid crystal devices 100 (liquid crystal devices 100R, 100G, and 100B) to which each color of light is input, and the light source unit 890 supplies a predetermined color of light to the three liquid crystal devices 100 (liquid crystal devices 100R, 100G, and 100B).

In the projection-type display apparatus 1000, the light modulated in the three liquid crystal devices 100R, 100G, and 100B are synthesized in the dichroic mirrors 842 and 843 and the polarization beam splitter 840, and then the synthesized light is projected to a projection target member such as a screen 860 by a projection optical system 850.

Other Projection-Type Display Apparatuses

In the projection-type display apparatus, an LED light source that outputs each color of light is used as the light source unit, and each color of light output from the LED light source may be supplied to another liquid crystal device.

Other Electronic Apparatuses

As for the liquid crystal device 100 according to the invention, in addition to the above-described electronic apparatus, electronic apparatuses such as mobile phones, information mobile terminals (PDA: Personal Digital Assistants), digital cameras, liquid crystal televisions, car navigation devices, video phones, POS terminals, and apparatuses provided with a touch panel may be used as direct view type display devices.

The entire disclosure of Japanese Patent Application No. 2010-247144, filed Nov. 4, 2010 is expressly incorporated by reference herein.

What is claimed is:

1. A liquid crystal device comprising:
   a first substrate that is provided with a plurality of pixel electrodes on one face side;
   a second substrate that is provided with an opposite electrode opposed to at least one of the plurality of pixel electrodes;
   a liquid crystal layer that is retained between the first substrate and the second substrate;
   a terminal that is provided on the one face side of the first substrate;
   a first electrode that is electrically connected to the terminal, is formed of a conductive film formed of the same material as that of the terminal, and is formed on the one face side of the first substrate;
   a second electrode that is separated from the terminal and the first electrode, is formed of a conductive film formed of a material different from that of the terminal, and is formed on the one face side of the first substrate;

a third electrode that is electrically connected to the second electrode, is formed of a conductive film formed of the same material as that of the second electrode, is separated from the terminal and the first electrode, and is formed on the one face side of the first substrate; and an inter-substrate connection member that is interposed between the first substrate and the second substrate and that electrically connects the first electrode and the third electrode to the opposite electrode, wherein the first electrode and the third electrode are provided at positions adjacent to each other with a gap interposed therebetween, and the first electrode, the third electrode, and the opposite electrode are electrically connected to each other through the same inter-substrate connection member provided at least at the gap.

2. The liquid crystal device according to claim 1, wherein the first electrode and the third electrode are provided in a shape with a concave portion in which a convex portion is wedged from one side electrode toward the other side electrode in the face of the first substrate.

3. The liquid crystal device according to claim 1, wherein the opposite electrode is a common electrode opposed to the plurality of pixel electrodes.

4. The liquid crystal device according to claim 1, wherein the second electrode is a dummy pixel electrode provided in a neighboring area outside the pixel area in which the pixel electrodes are provided.

5. The liquid crystal device according to claim 1, wherein the second electrode and the third electrode are conductive metal oxide layers, and wherein the terminal and the first electrode are metal layers with standard electrode potential lower than that of the metal oxide layer.

6. The liquid crystal device according to claim 1, wherein a plurality of sets of the terminal, the first electrode, the third electrode, the second electrode, the opposite electrode, and the inter-substrate connection member are provided, to which different potentials are applied.

7. A projection-type display apparatus provided with the liquid crystal device according to claim 1, comprising:
a light source unit that outputs light supplied to the liquid crystal device; and
a projection optical system that projects light modulated by the liquid crystal device.

8. A projection-type display apparatus provided with the liquid crystal device according to claim 2, comprising:
a light source unit that outputs light supplied to the liquid crystal device; and
a projection optical system that projects light modulated by the liquid crystal device.

9. A projection-type display apparatus provided with the liquid crystal device according to claim 3, comprising:
a light source unit that outputs light supplied to the liquid crystal device; and
a projection optical system that projects light modulated by the liquid crystal device.

10. A projection-type display apparatus provided with the liquid crystal device according to claim 4, comprising:
a light source unit that outputs light supplied to the liquid crystal device; and
a projection optical system that projects light modulated by the liquid crystal device.

11. A projection-type display apparatus provided with the liquid crystal device according to claim 5, comprising:
a light source unit that outputs light supplied to the liquid crystal device; and
a projection optical system that projects light modulated by the liquid crystal device.

12. A projection-type display apparatus provided with the liquid crystal device according to claim 6, comprising:
a light source unit that outputs light supplied to the liquid crystal device; and
a projection optical system that projects light modulated by the liquid crystal device.

* * * * *